(12) United States Patent
Wade et al.

(10) Patent No.: US 8,266,333 B1
(45) Date of Patent: Sep. 11, 2012

(54) SYSTEM AND METHOD FOR PARALLEL IMAGE PROCESSING AND ROUTING

(75) Inventors: Jack Wade, La Jolla, CA (US); Charles Siewert, Del Mar, CA (US)

(73) Assignee: Z Microsystems, Inc., San Diego, CA (US)

( * ) Notice: Subject to any disclaimer, the term of this patent is extended or adjusted under 35 U.S.C. 154(b) by 134 days.

(21) Appl. No.: 12/776,048

(22) Filed: May 7, 2010

Related U.S. Application Data

(60) Provisional application No. 61/182,624, filed on May 29, 2009, provisional application No. 61/234,577, filed on Aug. 17, 2009.

(51) Int. Cl.
*G06F 3/00* (2006.01)
*G06F 13/00* (2006.01)

(52) U.S. Cl. .................... 710/8; 710/5; 710/14; 710/33; 710/36

(58) Field of Classification Search .................... None
See application file for complete search history.

(56) References Cited

U.S. PATENT DOCUMENTS

2009/0185077 A1* 7/2009 Merritt ........................... 348/593
2010/0295945 A1* 11/2010 Plemons et al. ............... 348/148

* cited by examiner

*Primary Examiner* — Scott Sun
(74) *Attorney, Agent, or Firm* — Sheppard Mullin Richter & Hampton LLP

(57) ABSTRACT

The present invention is directed toward a system and method for simultaneously switching multiple input image streams to multiple output devices while providing optional image processing functions on the image streams. The incoming image streams may come from computers, cameras, radar, or other image stream generating devices. The incoming streams may vary in resolution, frame rate, format, and protocol according to the characteristics and purpose of their respective source devices. The incoming image streams can be iteratively routed through a reconfigurable array of image processing circuit cards to operate on one or more streams using preprogrammed algorithms. A processed stream can be routed through another processing function, or to an output circuit card that sends the completed image to the external display, recording device, across a network, or to another logical destination.

50 Claims, 18 Drawing Sheets ial application Ser. No. 61/182,624 filed May 29, 2009, and 61/234,577 filed Aug. 17, 2009, each of which is hereby incorporated herein by reference in its entirety.

SYSTEM AND METHOD FOR PARALLEL IMAGE PROCESSING AND ROUTING

RELATED APPLICATION

This application claims the benefit of U.S. Provisional Patent Application Ser. No. 61/182,624 filed May 29, 2009, and 61/234,577 filed Aug. 17, 2009, each of which is hereby incorporated herein by reference in its entirety.

TECHNICAL FIELD

The present invention relates generally to video and data stream processing, and more particularly, some embodiments relate to simultaneously processing multiple image streams with selectable algorithms in real time.

DESCRIPTION OF THE RELATED ART

Unmanned aerial vehicles (UAVs) are often equipped with a variety of sensors that provide a wide range of imagery and telemetry data to a ground control station. UAVs are operated under a broad range of conditions and are equipped with various sensor systems to allow this operation. For example, a UAV may be equipped with a video camera, an infrared camera, and a synthetic aperture radar system, allowing it to operate under a broad range of conditions. Data from these different sources are typically displayed on different display devices within the ground control station. These data streams are typically transmitted using a variety of protocols and formats according to the source device and purpose of the data stream. Accordingly, a ground control station typically devotes separate resources to the separate data streams.

BRIEF SUMMARY OF EMBODIMENTS OF THE INVENTION

The present invention is directed toward a system and method for simultaneously switching multiple input image streams to multiple output devices while providing optional image processing functions on the image streams. The incoming image streams may come from computers, cameras, radar, medical devices, or other image stream generating devices. The incoming streams may vary in resolution, frame rate, format, and protocol according to the characteristics and purpose of their respective source devices. The incoming image streams can be iteratively routed through a reconfigurable array of image processing circuit cards to operate on one or more streams using preprogrammed algorithms. A processed stream can be routed through another processing function, or to an output circuit card that sends the completed image to the external display, recording device, across a network, or to another logical destination.

For example, a system or method in accordance with the present invention may selectively and dynamically route one or more image input streams through one or more dynamically selectable and iterative algorithm processing elements (or modules) before the resulting processed streams are routed to one or more selectable outputs. For some embodiments, dynamic selectability with respect to inputs means that one or more inputs can be selected or unselected in real time for routing to one or more image processing elements. For additional embodiments, dynamic and iterative selectability with respect to processing elements means that a selected image stream can be routed to one or more image processing elements simultaneously and in real time. The routing may be based upon criteria relating to the image stream's source, the image stream's content, or on the processing results of a preceding image processing element. The output of an image processing element may be directed back to the system or method for routing to a subsequent image processing element, or to one or more image outputs that supply an image stream to an output device (e.g., display, image recorder, or other image processor, or transmission device).

Accordingly, in one embodiment, a system for switching an image stream input to an image stream output is provided, comprising: an image stream input interface; an image stream output interface; a first image processing module, wherein the first image processing module is configured to accept an image stream from the image stream input interface or another image processing module, apply an image processing function to the image stream, and output a processed image stream; and a switching matrix, wherein the switching matrix is in communication with the image stream input interface, the image stream output interface, and the first image processing module such that the switching matrix can selectively map (i.e., route) the image stream input interface to the image stream output interface or to the first image processing module, and the switching matrix can selectively map the processed image stream from the first image processing module to the image stream output interface or to a second image processing module. An image stream includes both a steady flow of image frames (i.e., video) and image stills captured at a set interval (e.g., once every hour). Additionally, for some embodiments the system comprises a plurality of image processing modules, a plurality of image stream input interfaces, or a plurality of image stream output interfaces. Furthermore, in further embodiments, the system may be integrated into a display having a display output, wherein the image stream output interface is in communication with the display output.

In some embodiments, the image processing module is a field programmable gate array (FPGA) to which algorithms, such as image processing functions, can be programmed and changed if desired. Additionally, with the use of multiple image processing functions, algorithms, such as image processing functions, can be executed in a predetermined or adaptive sequence. Example algorithms include convolutions, real-time adaptive histograms, and algorithms capable of processing multiple frames simultaneously (e.g., image subtraction function).

After reading this description, one of ordinary skill in the art would understand that, depending on the embodiment, either the image stream input interface, the image stream output interface, or both may utilize unidirectional communication or bidirectional communication with input devices and output devices. For example, a system may be configured to receive control information from a controller interface device via an image stream output interface, or to send control information to an image source via an image stream input interface. In another example, the control information is received by the system through the Display Data Channel (DDC). Depending on the embodiment, the system may be configured to send control information to a device external to the system, through the image stream input interface.

In some embodiments, the switching matrix may selectively map an image stream input interface or a processed image stream in real-time. In further embodiments, the switching matrix may selectively map the image stream input interface to more than one image processing module or to more than one image stream output interface simultaneously. Additionally, in some embodiments, the switching matrix may selectively map the processed image stream to more than one image processing module or to more than one image stream output interface simultaneously. In other embodiments, the switching matrix may selectively map an image stream input interface or the processed image stream based on a criterion. For example, the switching matrix may selectively map an image stream input interface or a processed image stream based on its source or content. In another example, the switching matrix may selectively map a processed image stream based on the results of a preceding image processing module. Depending on the embodiment, the image processing module may have the capability of processing a plurality of image streams in parallel.

The image stream interface for some embodiments may be configured to receive the image stream from an image stream capture device, an image stream playback device, a computer system, a sensor device (e.g., sensors typically found on an aircraft, such as a radar system), or a medical device (e.g., endoscope). The image stream output interface for some embodiments may be configured to output to a display (e.g., liquid crystal display monitor), a computer system, or recording device (e.g., digital video recorder). Further, in some embodiments, the system may be configured to output an image stream through a virtual display.

In numerous embodiments, the system further comprises a data input interface, wherein the switching matrix is further in communication with the data input interface such that the switching matrix can further selectively map the data input interface to the image stream output interface or to the first image processing module. For some such embodiments, the image stream input interface may comprise the data input interface.

With respect to protocols and interface types, in various embodiments, the image stream input interface or image stream output interface has a Digital Video Interface (DVI) connector, High-definition Multimedia Interface (HDMI) connector, a Bayonet Neill-Concelman (BNC) connector, a fiber optic connector, a DisplayPort connector, a Universal Serial Bus (USB) connector, or a Firewire (IEEE1394) connector. In regard to formats, the image stream input interface is configured to convert from or the image stream output interface is configured to: a Digital Video Interface (DVI) standard (e.g., DVI-D digital mode, DVI-A analog mode), a High-definition Multimedia Interface (HDMI) compatible standard, a Red-Green-Blue (RGB) Analog standard, a Red-Green-Blue (RGB) Digital standard, a DisplayPort standard, a National Television System Committee (NTSC) standard, a Phase Alternate Line (PAL) standard, or a Serial Digital Interface (SDI) standard.

The image processing function in some embodiments may comprise an image stream mix function, an image stream scale function, an image stream blend function, an image stream encoding algorithm, or an image stream enhancement function. For those embodiments having an image stream enhancement function, the image stream enhancement function may comprise a de-haze function, a de-blur function, a shadow function, a dawn-dusk function, a fusion function, a (motion) stabilization function, a thermal turbulence function, an equalization function, an edge detection function, a rain and fog function, or a light optimizing function. Further, in some embodiments, the system can eliminate or reduce frame latency by configuring an image processing module to apply processing results of a given frame to a subsequent frame.

In additional embodiments, where the image stream is provided by an endoscope, the image processing function can enhance the image stream for detecting texture differences in living tissue, detecting a polyp, detecting anomalous tissue, detect blood circulation, or identifying reference locations for subsequent registration of images from another modality. In further embodiments, a light optimizing function may adjust a color channel for the image stream in order to detect polyps. For example, the system may apply image processing functions in real time to image feeds from an endoscope in order to detect differences in living tissue, detect anomalous tissue, determine boundaries where tissue texture changes (for tissue volume and size information), and identify reference locations for subsequent registration of images from other modalities.

With respect to the last objective for image processing function, image registration is the process of determining the alignment between two images that have overlapping regions, where the images may be acquired at different times and/or by different sensors. The difficulty in aligning such images is further increased during multi-modal image registration, where the images are acquired using different imaging techniques (e.g., two images that share similar content may have very different intensity mappings).

One area where the alignment of images of different modalities (i.e, multi-modal image registration) is important is in the field of medical imaging. Different medical imaging techniques, such as x-rays, computed tomography (CT), magnetic resonance imaging (MRI), and positron emission tomography (PET), reveal different types of information about the body that can be used in the diagnosis of a disease. For example, consider the comparison of a slice from a cranial T1-weighted MRI scan and its corresponding CT scan. The bone structure of the head, for example, will be clearly visible in the CT scan, and indicated by the bright areas in the image. The bone structure has a higher radiodensity than the surrounding tissue. This is not the case for an MRI scan where, unlike the CT scan, tissue differences can be clearly distinguished. Accordingly, the alignment of images of different modalities (e.g., image from a MRI scan and a CT scan) would allow for a better overall picture of a patient's condition. Accordingly, in some embodiments, algorithms such as edge detection, sum of squared differences (SSD) and Fast Fourier Transform (FFT) are programmed into the image processing module such that multi-modal registration of images, such as from multiple medical imaging modalities, can be achieved. Sum of squared differences (SSD) is a common metric used for judging image similarity by a weighted sum of squared differences (SSD) cost function. The evaluation of the SSD cost function can be performed efficiently using the Fast Fourier Transform (FFT) to determine the optimal translation between two images based on pixel intensities.

In some embodiments, the image stream enhancement function performed by the image processing module comprises an auto-focus function capable of adjusting focus of an image stream capture device that is coupled to the image stream input interface and producing the image stream. For example the auto-focus function may comprise the operations of: performing an edge detection algorithm on the image stream, thereby producing the processed image stream; and generating focus instructions for the image stream capture device based on the processed image stream. In further such embodiments, the operations of the auto-focus function are repeated iteratively until the image stream capture device is in-focus. In other embodiments, the edge enhancement algorithm utilizes a Laplacian convolution.

In certain embodiments, the system further comprises a control interface through which a user may operate or configure the system, among other things (e.g., check status of the system). For some such embodiments, the control interface may comprise a display touch panel having a graphical user interface, a keyboard, or a mouse, which are all examples of human machine interfaces (HMIs). For particular embodiments where the image stream output interface is outputting to a computer system, the control interface may be directly connected to the system and not connected to the computer system.

In some embodiments, the system can detect what type of image stream input interface, image stream output interface, or image processing module is present in the system, and configure the system according to the type. Further, in some embodiments, the system can detect what type of image stream input interface, image stream output interface, or image processing module is present in the system, and configure the control interface according to the type. For example, the system may detect the types of circuit cards present in each card slot of its chassis, self-configure the mix of image input cards, image processing cards, and image output cards detected, and present to the user a visual representation interface according to the mix for the purpose of providing image routing choices. It should be noted that in some embodiments the control interface comprises virtual buttons.

Additional embodiments provide for methods for switching an image stream input to an image stream output. In particular, one such method comprises: receiving an image stream through an image stream input interface; using a switching matrix to selectively map the image stream to: a first image processing module, wherein the first image processing module is configured to accept the image stream from the image stream input interface or another image processing module, apply an image processing function to the image stream, and output a processed image stream, or an image stream output interface. For some such embodiments, if the switching matrix selectively maps the image stream to the first image processing module, the first image processing module may perform the operations of: receiving the image stream from the image stream input interface or another image processing module; applying the image processing function to the image stream; and outputting the processed image stream. Furthermore, for some such embodiments, if the switching matrix selectively maps the image stream to the first image processing module, the switching matrix may selectively map the processed image stream to a second image processing module or to the image stream output interface.

Other embodiments provide for a computer readable storage medium having instructions embedded thereon to cause a processor to perform operations similar to those described above with respect to the various systems and methods in accordance with the present invention.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE
EMBODIMENTS OF THE INVENTION

Figure 1A:
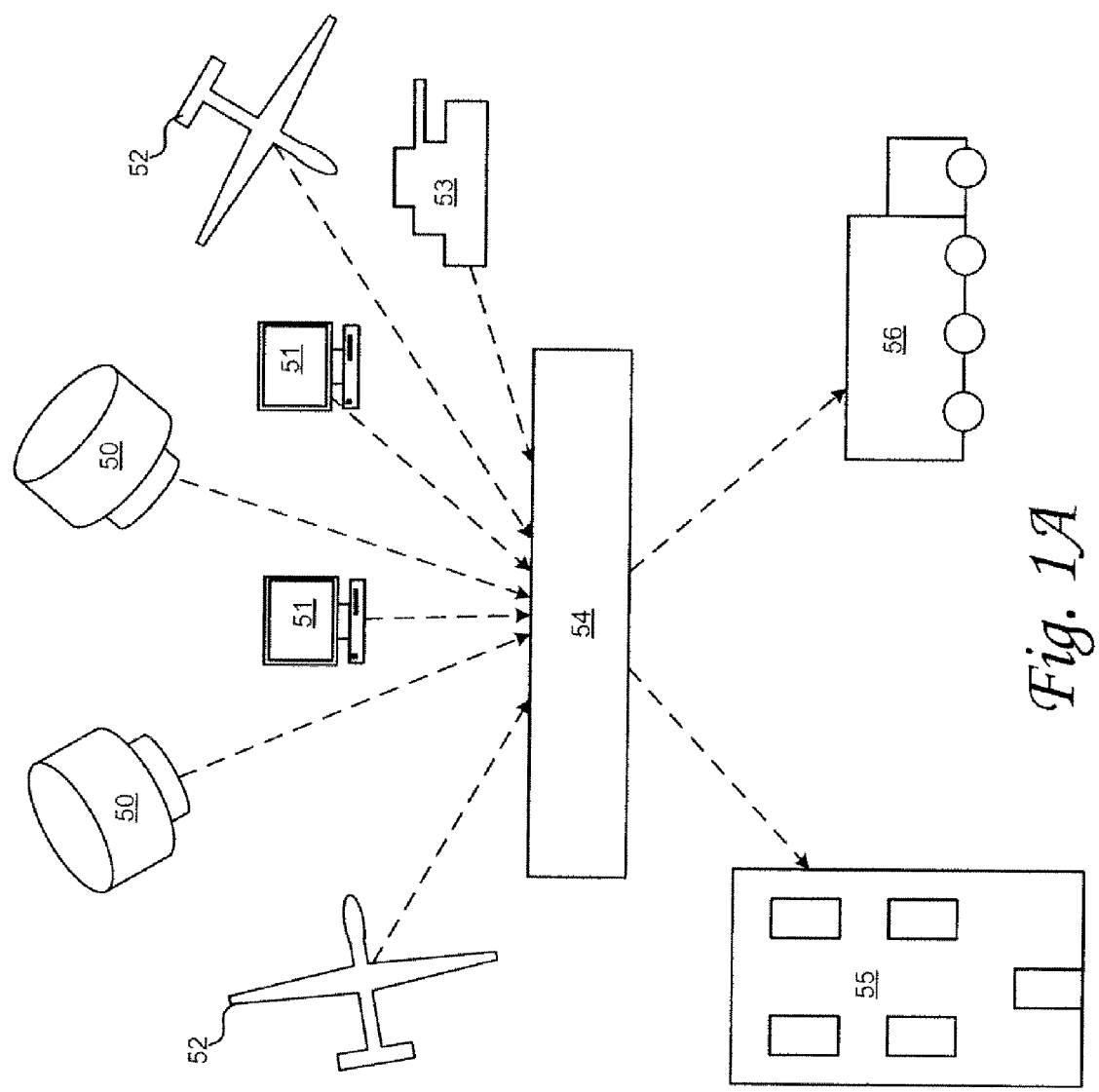
FIG. 1A illustrates an example environment in which an embodiment of the invention might be employed.

Before describing the invention in detail, it is useful to describe an example environment with which the invention can be implemented. One such example is that of a military operation, an example of which is shown in FIG. 1A. Video feeds and other data are processed and relayed by a system 54 to one or more destinations 55 and 56. For example, the video feeds and other data may comprise satellite imagery feeds transmitted by satellite 50; airborne sources of information such as live video or radar feeds from aircraft, such as unmanned aerial vehicles (UAVs) 52 or a manned surveillance aircraft (not shown); ground-based information, such as imagery from ground vehicle 53; or any other video or data feed, such as prerecorded video of terrain stored in computers 51 for use in providing contextual information for a live video stream. In this environment, the data from the various data sources are combined in system 54 and relayed to destinations 55 and 56. For example, destination 55 might comprise a headquarters that is overseeing the military operation and destination 56 may comprise a mobile operations center in charge of coordinating the operation or a portion of the operation. For example, mobile operations center 56 may comprise a UAV operations center charged with piloting the UAVs 52. In many implementations, destinations 55 and 56 may contain a plurality of different devices to receive incoming data, such as multiple displays, storage devices, or satellite transmitters. Moreover, various personnel may desire access to all or a portion of the available data. Accordingly, system 54 may be configured to selectively transmit different portions of the data to the various displays according to the needs of the personnel.

Figure 1B:
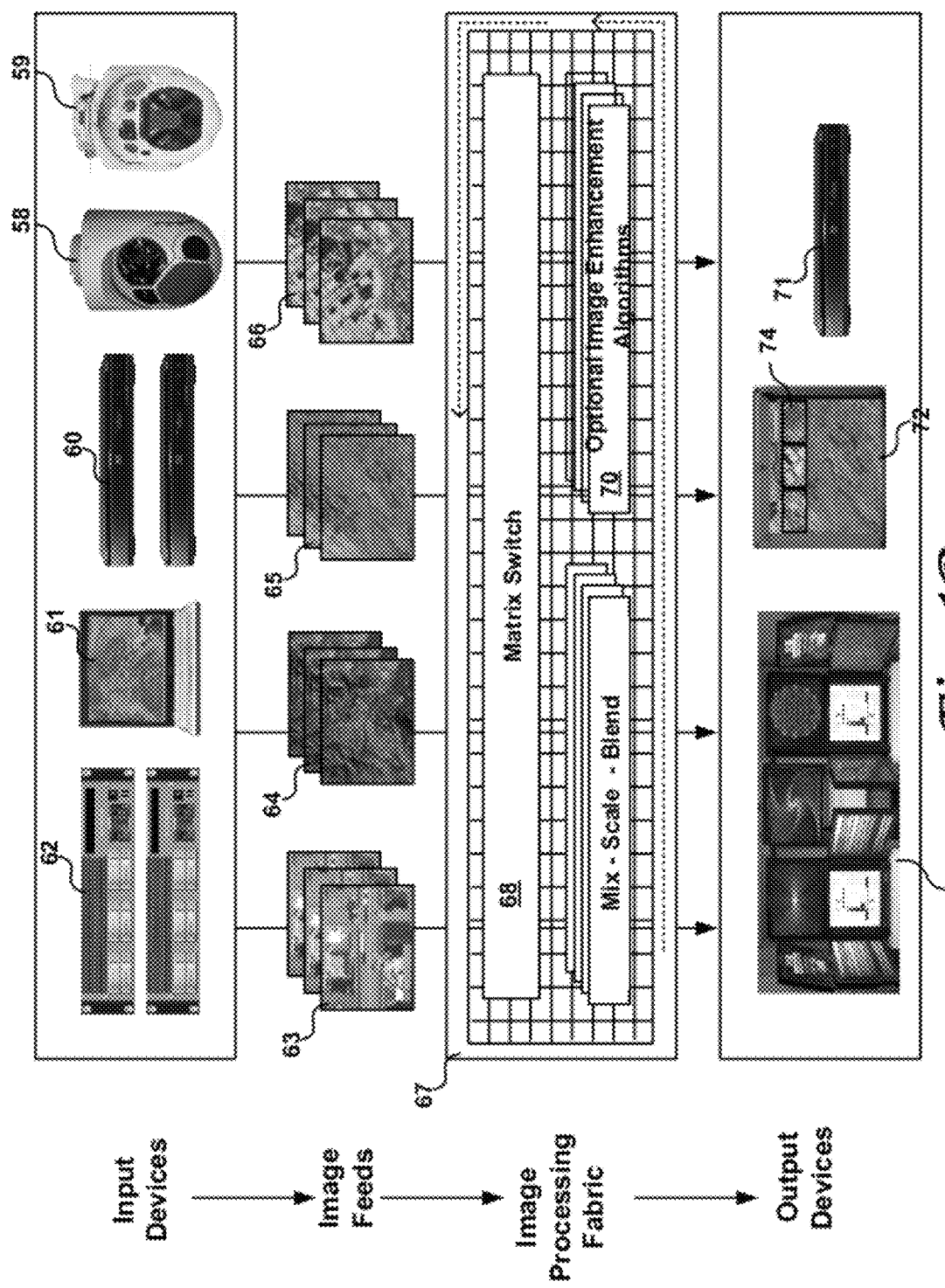
FIG. 1B illustrates an example system process of an embodiment of the invention.

FIG. 1B illustrates an example system process of an embodiment of the invention deployed in the environment of FIG. 1A. A plurality of input devices, such as computers 62 and 61, storage devices 60, and sensor devices 58 and 59 transmit a corresponding plurality of image feeds to the system 67. For example, the image feeds might comprise satellite imagery 63, high-altitude terrain imagery 64, prerecorded terrain imagery 65, or an infrared video feed 66. The image feeds are then transmitted to the system 67 for processing and routing to a variety of output devices. A matrix switch 68 allows the image feeds to be directly routed to the output devices or to be routed through one or more image processing or other functional modules. For example, a system might comprise a dedicated subsystem of image processing modules 69 to perform mixing, scaling, blending functions, and image enhancement functions. In some embodiments, the most common image processing functions may be performed on a dedicated subsystem 69. In the embodiment illustrated in FIG. 1B, these are mixing multiple image streams together, for example to create a virtual display 74; scaling image streams, for example interpolating an image to increase image resolution for comfortable viewing on a larger screen; and blending image streams, for example to overlay one image stream on top of another. In these embodiments, configurable or interchangeable functions may be performed on a second subsystem 70. Such functions might comprise image enhancement functions as image stabilization, image de-blurring, image de-hazing, dawn/dusk compensation, temporal blending, image or sensor fusion algorithms, or edge detection, or such functions as video encoding or compression algorithms such as an H.264 encoding algorithm. The processed image streams may be routed to an output device, or rerouted through another functional module. For example, a composite image stream could be formed by performing a sensor fusion algorithm on an infrared video stream and an optical video stream, then the composite image stream could be routed through an encoding module to form an encoded composite image streams for storage on a video storage device. A variety of different output devices may be used with embodiments of the invention, such as video displays 73, virtual display 74 comprising one or more mixed or overlaid image streams, or video storage device 71.

Further image enhancement functions can also include an auto-focus function configured to adjust the focus of an input device coupled to the system 67 based on the image feed provided by the input device. For example, according to one embodiment, the auto-focus function within an image processing module 69 could adjust the focus of an input device by first receiving an image feed from the input device, performing an edge detection algorithm on the image feed, and then producing a processed image feed that would enable easier detection of an edge. Next, based on the processed image feed, the auto-focus function would generate a focus instruction for the input device. Once the focus instructions have been implemented by the input device, the process may iteratively repeat until the input device comes into focus. In other words, the new image feed provided by the now adjusted input device would be provided to the auto-focus function, the auto-focus function would perform edge detection on the new image feed, and the auto-focus function would, if necessary, generate additional focus instructions for the input device to implement based on the new processed image feed. Optionally, the auto-focus function may utilize a Laplacian convolution in its edge detection algorithm.

From time-to-time, the present invention is described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

Figure 2A:
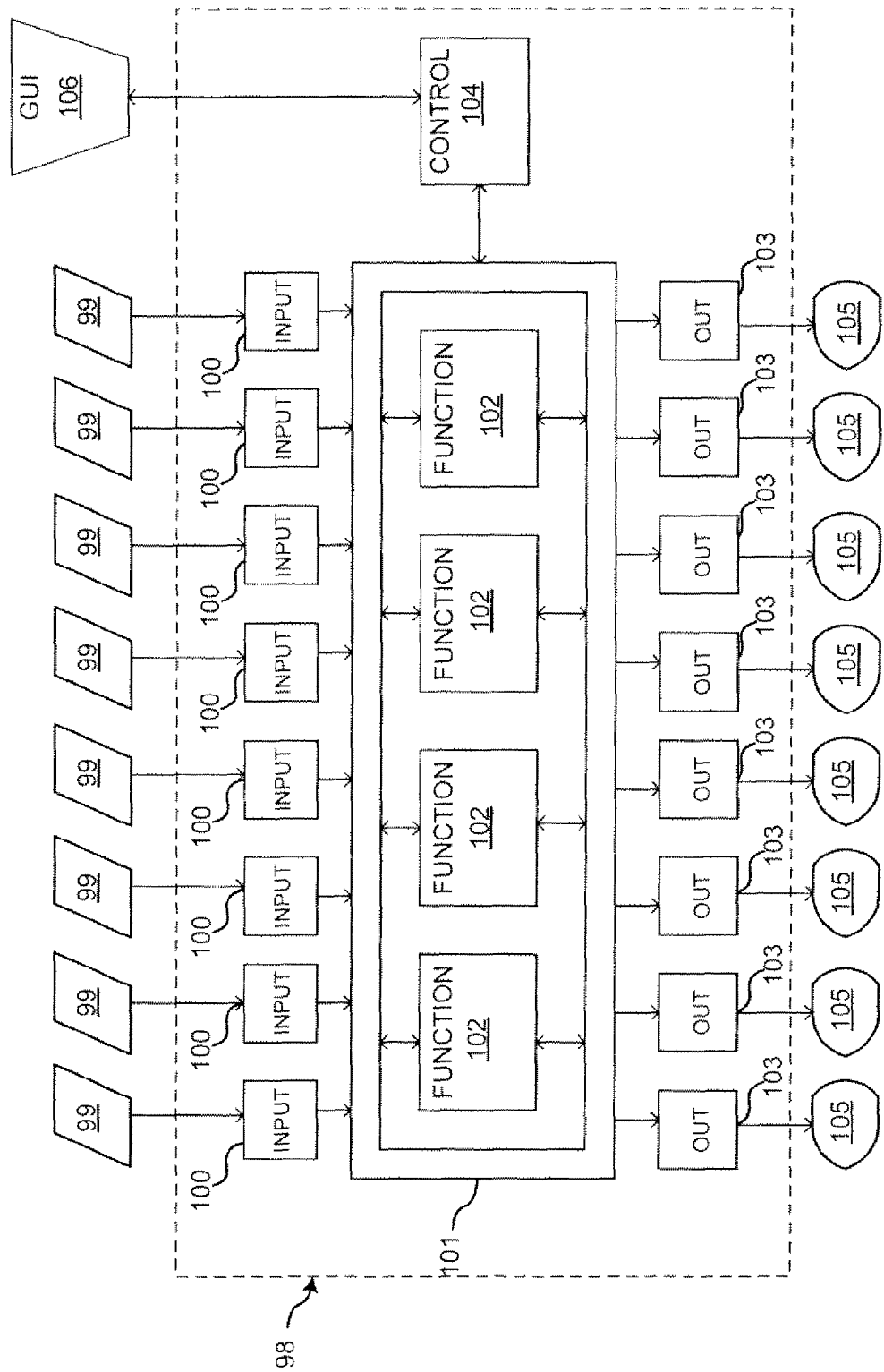
FIG. 2A illustrates a configurable system for simultaneously processing multiple data streams according to an embodiment of the invention.

FIG. 2A illustrates a configurable system for simultaneously processing multiple data streams according to an embodiment of the invention. A plurality of data sources 99 are coupled to the system 98 by way of a plurality of input modules 100. The plurality of data sources 99 transmit a corresponding plurality of data streams to the system 98. Depending on the type of data source, these data streams may vary in resolution, frame rate, format, and protocol. For example, a helmet mounted camera may transmit a low resolution and low frame rate image stream to the system 98 that is both compressed and encoded; a UAV-mounted camera may provide an encoded high resolution and high frame rate image stream; and a computer may provide a static or slowly varying chroma mask for inserting information into a displayed image stream. Accordingly, in this embodiment, the input modules 100 are configured to receive these different data streams and convert them to a common format for use in system 98. For example, inputs 100 may convert the image streams to an uncompressed 30 frame per second video feed comprising four differential signals (red, green, blue, and clock signals) according to the Digital Video Interface (DVI) standard.

In additional embodiments, inputs 100 may convert the images streams to other standards, such as a High-definition Multimedia Interface (HDMI) standard, a Red-Green-Blue (RGB) Digital standard, a Red-Green-Blue (RGB) Analog standard, a DisplayPort standard, a National Television System Committee (NTSC) standard, a Phase Alternate Line (PAL) standard, Serial Digital Interface (SDI) standard. Accordingly, various embodiments may have inputs 100 further configured with a variety of connector types, thereby enabling system 98 to accept image streams based on different protocols, formats, and standards. For example, some of those connector types include Digital Video Interface (DVI), High-definition Multimedia Interface (HDMI), Bayonet Neill-Concelman (BNC), fiber optic, DisplayPort, Universal Serial Bus (USB), and Firewire (IEEE1394).

Continuing with the illustrated embodiment, input modules 100 are coupled to a switch fabric 101 that allows the converted image streams to be routed to any of the output modules 103 or function modules 102. For example, switch fabric 101 may comprise a crossbar switch or crossover switch matrix. The embodiment further comprises a control module 104 in communication with a graphical user interface (GUI) 106 and the switch fabric 101. In this embodiment, the control module 104 is in electrical communication with the switch fabric 101 to allow the routing configuration of the switch fabric 101 to be controlled. The GUI 106 interfaces with the control module 104 to allow the system user to control which image streams are subject to which image processing functions and where those image streams are eventually displayed. For example, the GUI 106 might comprise a touch screen interface displaying a graphical representation of the system that is configured to allow a user to control the image stream routing and processing through tactile commands. In this example, the control module 104 may interface with the GUI 106 and translate the graphical manipulations performed at the GUI 106 to the corresponding electrical signals necessary to reconfigure the switch fabric 101 to conform to the user's desired routing and processing configuration.

In this embodiment, the switch fabric 101 is in further communication with a plurality of functional image processing modules 102 and a plurality of output modules 103. A functional image processing module 102 is configured to receive one or more image streams via the switch fabric 101, to perform a predetermined function on the received image streams, and output the results as one or more image streams back into the switch fabric 101. In some embodiments, the output of the image processing modules 102 is configured to be compatible with the output of input modules 100. Accordingly, image streams that are output from a first function 102 can be utilized as input streams for a second function 102, and so on. For example, live video from a UAV can be combined with a synthetic aperture radar (SAR) data stream for use in de-hazing the live video stream and a de-hazed live video stream may be provided to an edge detecting functional module to provide a de-hazed and edge detected video stream to a display 105.

Output modules 103 are configured to receive the data streams from the switch fabric 101 and to format them for display on a plurality of display devices 105. For example, one of the output modules 103 may receive an uncompressed video stream from the switch fabric 101 and format it to be compressed and encoded for transmission to a display device 105 situated in a remotely located headquarters. As another example, the GUI 106 may be integrated into one or more of the display devices 105 such that use of the control module 104 comprises manipulating an image displayed on the display device 105 to perform sensor fusion. For example, a user may use a touch display to drag an infrared video stream onto a SAR data stream combining the infrared video stream with the SAR data stream through a sensor fusion algorithm. The GUI 106 then causes the control module 104 to route the infrared video stream and the SAR data stream onto a fusion functional module 102 to display a combined infrared/SAR video stream on the display device 105.

It should be noted that, in addition to military applications, the various systems and methods in accordance with the present invention are also particularly useful in the medical field. Specifically, various embodiments of the invention can be utilized with medical imaging devices, where image streams provided by medical imaging devices can be processed or enhanced for analysis purposes. For example, an endoscope may be used in conjunction with a system in accordance with one embodiment, whereby the system receives an image stream from the endoscope, the system maps the image stream to an image processing module that applies light optimizing functions to the image stream, and the system outputs the results from the image processing module to an Output module for display. By doing so, the image stream from the endoscope is enhanced for polyp detection. The light optimizing function may adjust a specific color channel (e.g., red, green, blue) for the image stream, or may adjust the color within a predetermined wavelength range for the image stream (e.g., a predetermined range centered around 10% of the center wavelength). In some embodiments, a graphical user interface may be displayed on the output device in conjunction with the output image stream to enable a system user to modify various parameters of the image processing module. For instance, a user may be able to select a color channel for the displayed image stream and be able to modify the color channel according to user preferences. For example, a user may desire to modify a red channel of the color stream to increase the red channel contrast and modify the red channel tint.

Figure 2B:
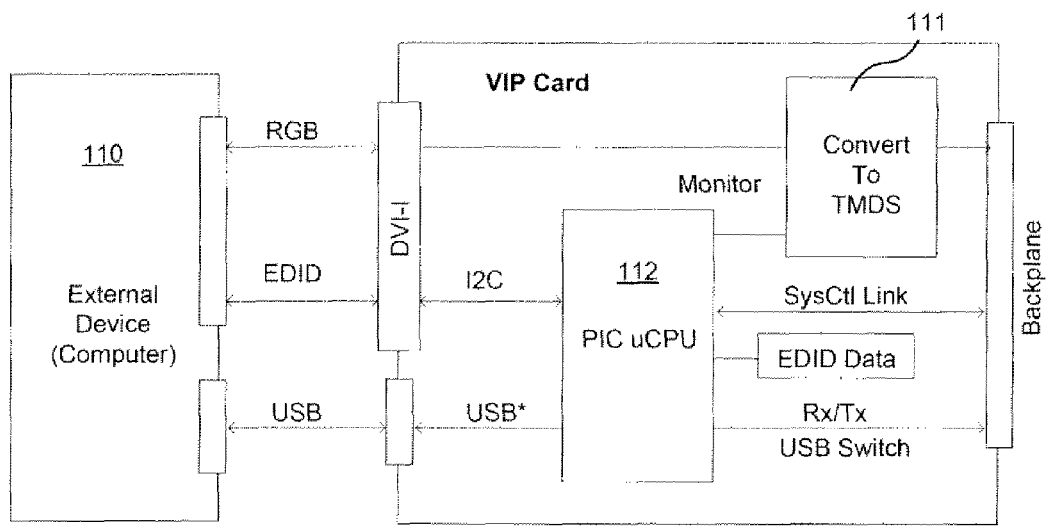
FIG. 2B illustrates an example video input module according to an embodiment of the invention.

FIG. 2B illustrates an example video input module according to an embodiment of the invention. As described herein, data sources used in various embodiments of the invention may be configured using different protocols and formats. For example, an external device 110, such as a computer, may be configured to wirelessly receive and decode radio transmitted video signals and provide them in an analog format according to the DVI-I protocol. The analog signal is transmitted to the conversion module 111 for conversion to a digital standard, such as TMDS. The digitally converted signal is then provided to the switch fabric 101, as described herein. A control module 112 is provided to implement system control functions. For example, the control module 112 may be configured to monitor the conversion module 111 for reporting to the system wide control module, such as module 104 described with respect to FIG. 2A. The control module 112 may be further configured to interface with the external devices, for example through a digital data control channel or a USB interface. For example, some data sources may be devices that are controllable, such as a remote sensor configured to controllably alter its field of view. Accordingly, in addition to receiving data from them, some embodiments may be equipped with the ability to transfer commands and information to the data sources.

Figure 2C:
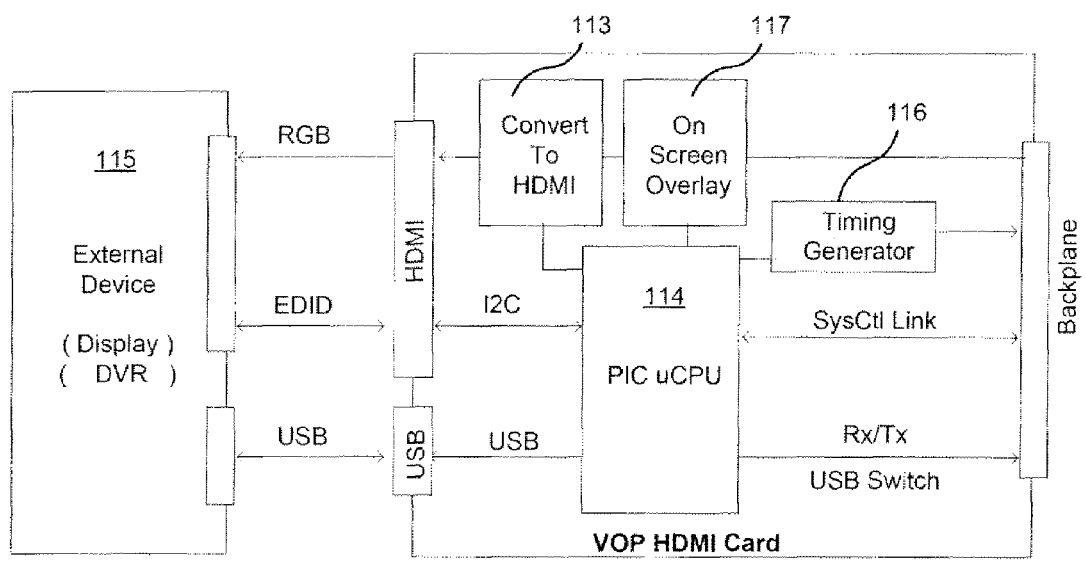
FIG. 2C illustrates a video output module according to an embodiment of the invention.

FIG. 2C illustrates a video output module according to an embodiment of the invention. As with the input devices, a variety of output devices may interface with the system according to various embodiments of the invention. For example, output devices may comprise radio transmission links, video displays, or recording devices. Accordingly, to interface with these various output devices, a video output module may comprise a conversion module 113 configured to convert the signal received from the switch fabric 101 to an appropriate format for the particular output device 115 coupled to the video output module. A video output control module 114 may also be provided to implement various other functions. For example, control module 114 may monitor the conversion module 113 for reporting to the system wide control module. The control module 114 may also receive display 1D information from the external device 115 and provide that information to the system wide control module. In some embodiments, the output device 115 may have particular timing requirements, so the video output module may be further provided with a timing generator module 116 that provides the timing channel for the DVI-D link under the immediate control of the control module 114 and under general control by the system wide control module. For example, timing generator module 116 may generate a timing channel and provide it to a blending and mixing functional module 102 so that multiple asynchronous image streams may be synchronized for image combination and display on output device 115. Additionally, in systems configured to receive information from output devices, the control module 114 may be configured to relay that information to the system. For example, some embodiments may utilize a USB 2.0 communications protocol to allow the output device 115 to transmit data and control information to other devices in communication with the system. In a particular embodiment, some of the other devices in communication with the system are configured for full duplex communications, so to implement USB-based communications, the control module 114 converts the half-duplex USB 2.0 to a full duplex.

Figure 2D:
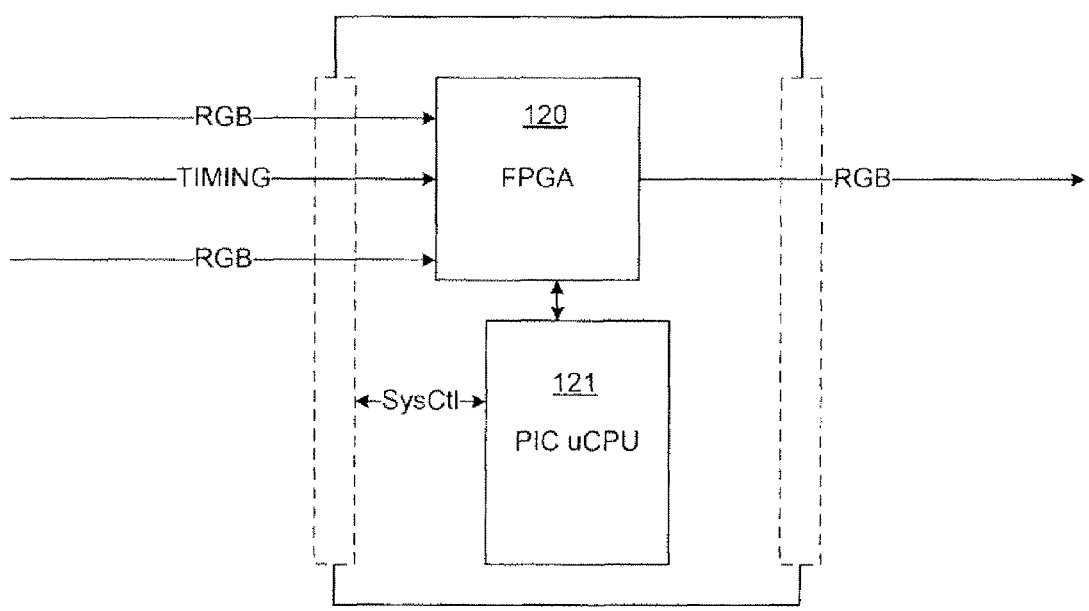
FIG. 2D illustrates a functional image processing module according to an embodiment of the invention.

FIG. 2D illustrates a functional image processing module according to an embodiment of the invention. A function module 120 is provided to receive one or more input video streams from the switch fabric 101 and to perform image processing algorithms upon them. The processed video streams are output back onto the switch fabric 101 for use as an input in another function module or transmission to an output device. Additionally, a timing signal, for example as generated by a video output module described with respect to FIG. 2C, may be received by the function module 120 for synchronization and timing formatting. For example, such a timing signal may be used for chromakey-based mixing of two incoming video signals. A control module 121 is further provided to implement system control functions. For example, the control module 121 may be configured to monitor the operations of the function module 120 for reporting to the system wide control module. In some embodiments, the function module 120 may be configured to implement one of a plurality of image processing algorithms, and the choice of algorithm may be controlled by the control module 121 under command from the system wide control. Additionally, some function modules may be configured to download and receive new image processing algorithms. These new algorithms may be transmitted through the system control link and programmed into the function module 120 by the control module 121.

Figure 2E:
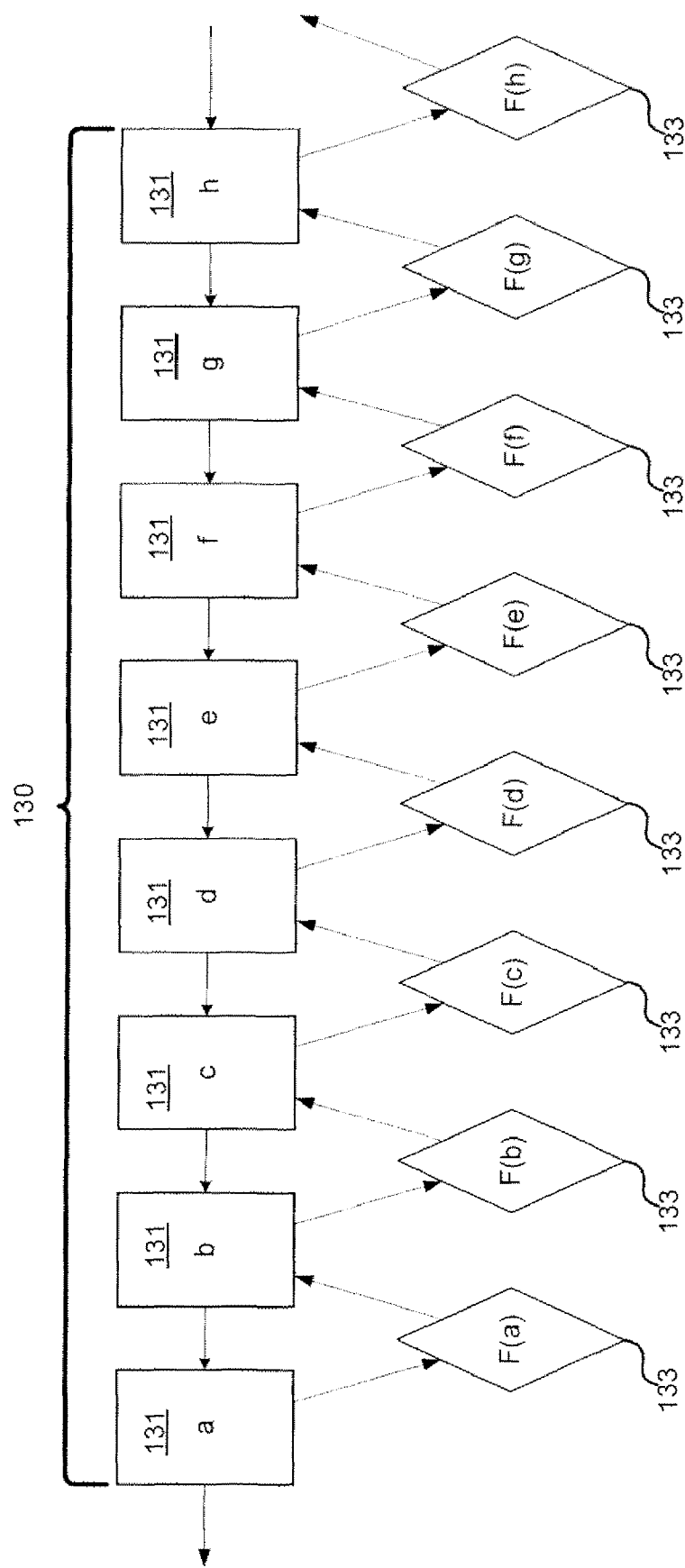
FIG. 2E illustrates a method of image processing performed by a functional image processing module according to an embodiment of the invention

FIG. 2E illustrates a general method for image processing according to an embodiment of the invention. Image stream 130 comprises a plurality of frames 131 transmitted at particular time intervals, such as 30 frames per second. In many cases, image stream 130 is unlikely to vary considerably from frame to frame, i.e. frame b is likely to be very similar to frame a, frame c will likely be very similar to frame b, and so on. Accordingly, latency may be avoided or reduced by applying the results of a processing function on a given frame to a subsequent frame. For example in FIG. 2E, the function 133 is computed for each frame and the results are applied to the next frame, i.e. F(a), the results of the function applied to frame a, are applied to frame b; F(b) is applied to frame c, and so on. In some embodiments, this method may be employed when the time it takes function module 120 to process a single image frame may be less than or equal to the time that image frame is displayed. In other embodiments, the results of a function performed on a frame may be applied to a plurality of following frames, or a frame that follows after a number of intervening frames. For example, the results of the function might be applied to the following three frames and the results function itself may be computed for every third frame. This method might be employed, for example, when computational requirements are larger and frame computations cannot be performed in parallel. As another example, the function may be computed for each frame as before, but the results of the computation might be applied to the fourth frame following the argument of the function. In other words, F(a) may be applied to frame d, F(b) may be applied to frame e, and so on. This method might be employed, for example, when computational time is longer than the time it takes each frame to be displayed but simultaneous frame computations may be performed. In other embodiments, these methods may be combined or implemented together and some latency may be tolerated according to environment-specific variables such as the image stream rate of change, the image stream frame rate, and the image processing function or functions being performed on the image stream.

Figure 3A:
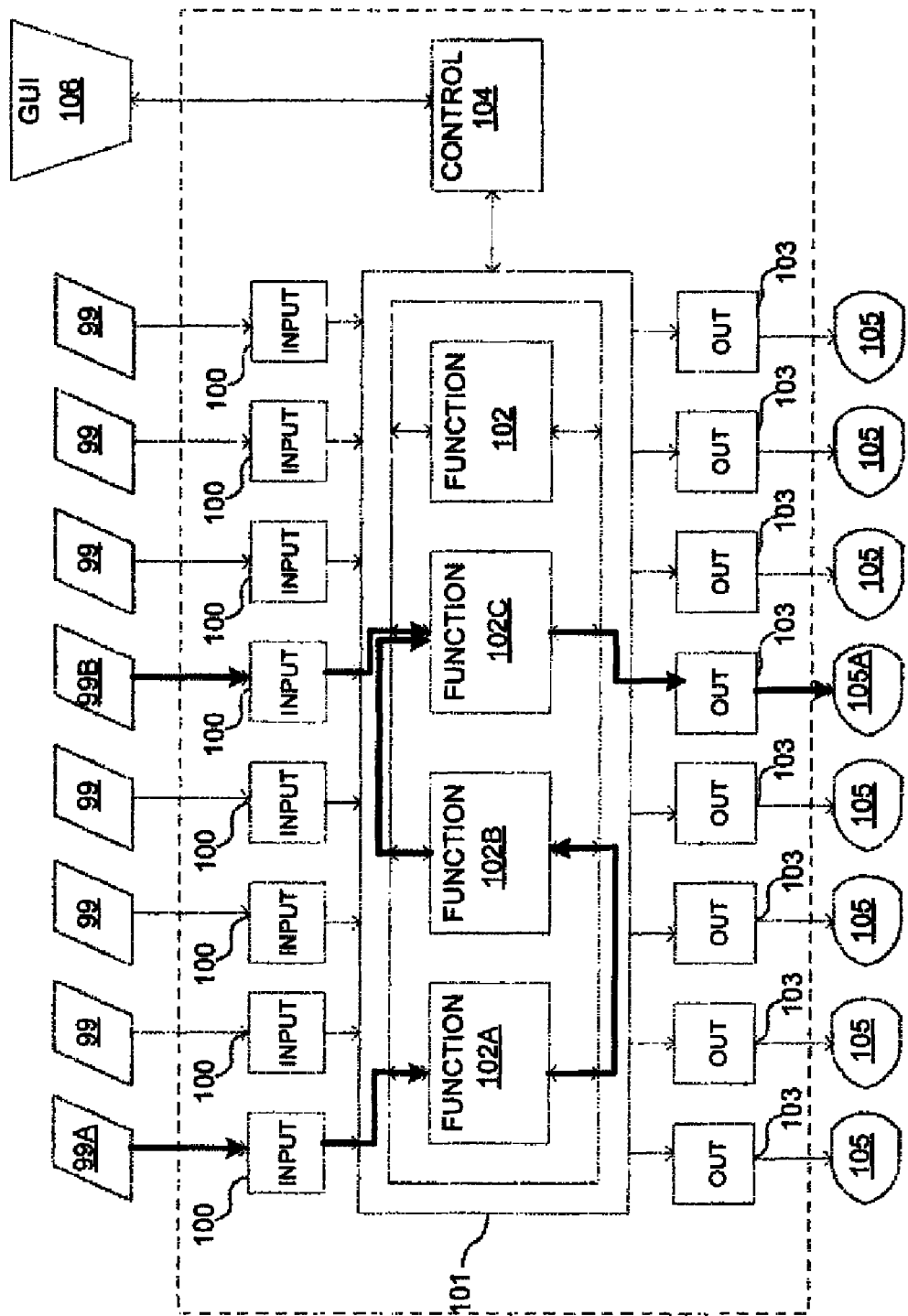
FIG. 3A illustrates an example of iterative image processing according to an embodiment of the invention.
Figure 3B:
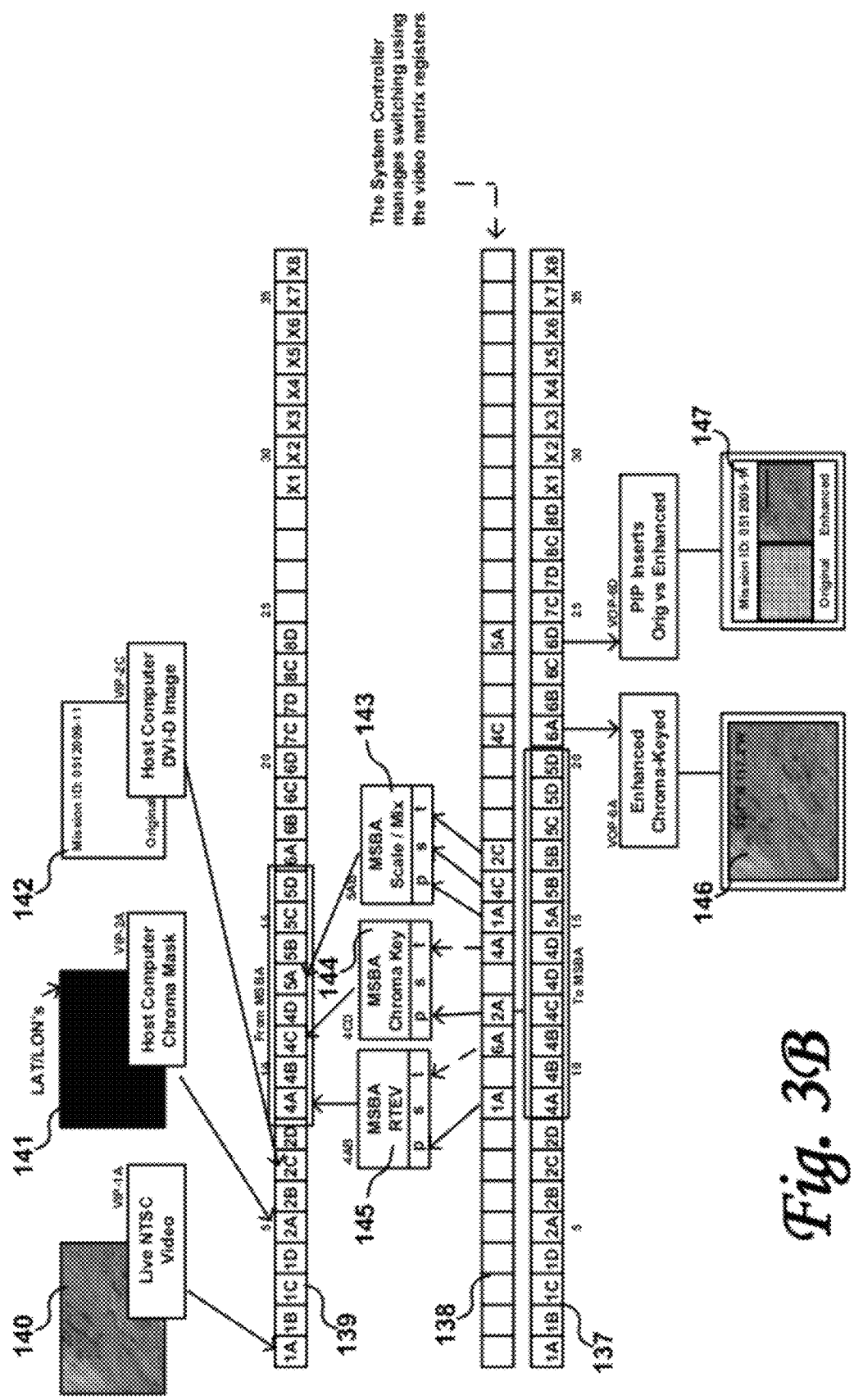
FIG. 3B illustrates a switch fabric implementation of iterative image processing according to a particular embodiment of the invention.

FIG. 3A illustrates an example of a routing process, where the data stream from data source 99A is routed through functional modules 102A, 102B, and 102C in that order, and then combined with the data stream from data source 99B to be displayed on display device 105A. FIG. 3B illustrates another example of a routing process, implemented on a fabric matrix switch in a system where image streams comprise four differential signal pairs, such as TMDS standard signals. In this example, the fabric matrix switch card may comprise a switch fabric having 144 addressable inputs (input interfaces) and 144 addressable outputs (output interfaces). The inputs and outputs may be further portioned into 36 addressed input ports and 36 addressed output ports, each port comprising four inputs or outputs corresponding to the four differential signal pairs of the image streams. In FIG. 3B, array 139 represents the addressed input ports, array 137 represents the addressed output ports, and array 138 represents the mappings from the input ports to the output ports.

In this example, an analog video feed 140 is converted to a digital standard and provided to the system on input port 1A. Chroma mask 141 comprising latitude and longitude coordinates is provided to the system on input port 2A. A mission ID image is further provided to the system on input port 2C. Port 1A is mapped to output ports 4A and 5A. Output port 4A outputs to module functional 145, which enhances the received feed 140 and provides the enhanced feed to input port 4A. Input port 4A is mapped to output port 4D, which outputs to functional module 144. Input port 2A is mapped to output port 4C, which also outputs functional module 144. Accordingly, functional module 144 applies chroma key image combination to the enhanced feed and the chroma mask to provide an enhanced and coordinate-overlaid feed to input port 4C. Input port 4C is mapped to both output port 6A and output port 5B. Output port 6A is coupled to a video screen 146, so that the enhanced and coordinate-overlaid feed is displayed on a video screen 146. Output port 5B is coupled to functional module 143 along with output port 5A and a second instance of output port 5B. Functional module 143 is configured to scale and combine the received image streams and overlay the mission ID 142 to form an image stream comprising the original analog video stream 140 in a reduced scale alongside the enhanced and coordinate-overlaid image stream, with the mission ID displayed near the top of the images. This mixed stream is provided to input port 5A, which is mapped to output port 6D and displayed on video screen 147.

Figure 3C:
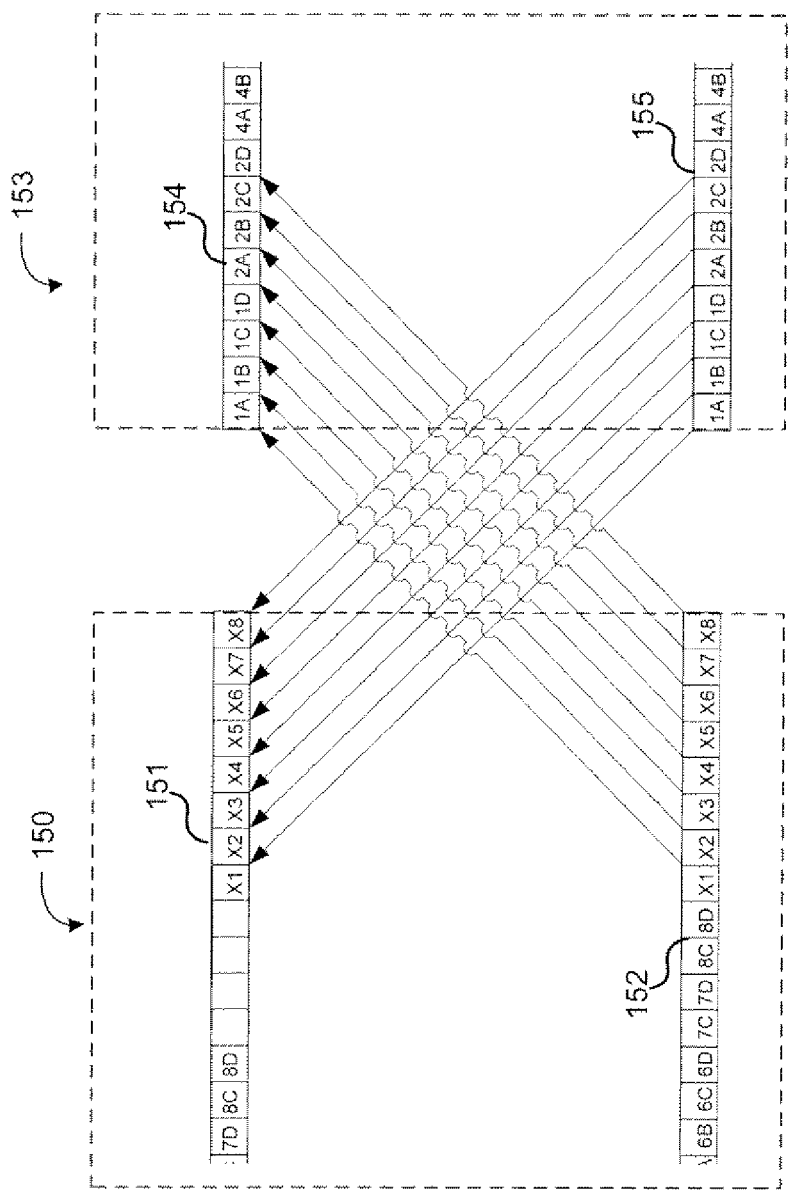
FIG. 3C illustrates a method of coupling switch fabrics according to an embodiment of the invention.

FIG. 3C illustrates a method for switch fabrics according to an embodiment of the invention. A portion of a first switch fabric 150 is illustrated with input array portion 151 and output array portion 152, and a portion of a second switch fabric 153 is illustrated with input array portion 154 and output array portion 155. By electrically coupling the output portions of the switch fabrics in the manner illustrated, the two switch fabrics may be combined such that an input device coupled to an input port of array portion 151 can be routed to an output of array portion 155. For example, input port 8D of array 151 might be mapped to output port X1 of array 152 which is in turn mapped to input port 1A of array 154. Input port 1A of array 154 may then be mapped to any of the output ports of array 155. In some embodiments of the invention, such fabric coupling may be employed to achieve a required number of input or output ports. In other embodiments of the invention, this method of fabric coupling may be extended arbitrarily, thereby allowing multiple embodiments of the invention to be coupled together to allow system scaling.

In further embodiments of the invention, the fabric coupling may be configured redundantly to enable failover operation. In yet further embodiments, the switching fabric is capable of supporting a variety of standard protocols in addition to video including, but in no way limited to, Ethernet, Serial Attached SCSI (SAS), Serial ATA (SATA), and PCI Express (PCI-E).

FIGS. 4-8 illustrate a process of configuring an embodiment of the invention for use in the ground station component of a UAV system. In this embodiment, a UAV ground station is equipped with a plurality of monitors, control systems, and communication devices to allow a number of personnel to operate one or more UAVs.

Figure 4:
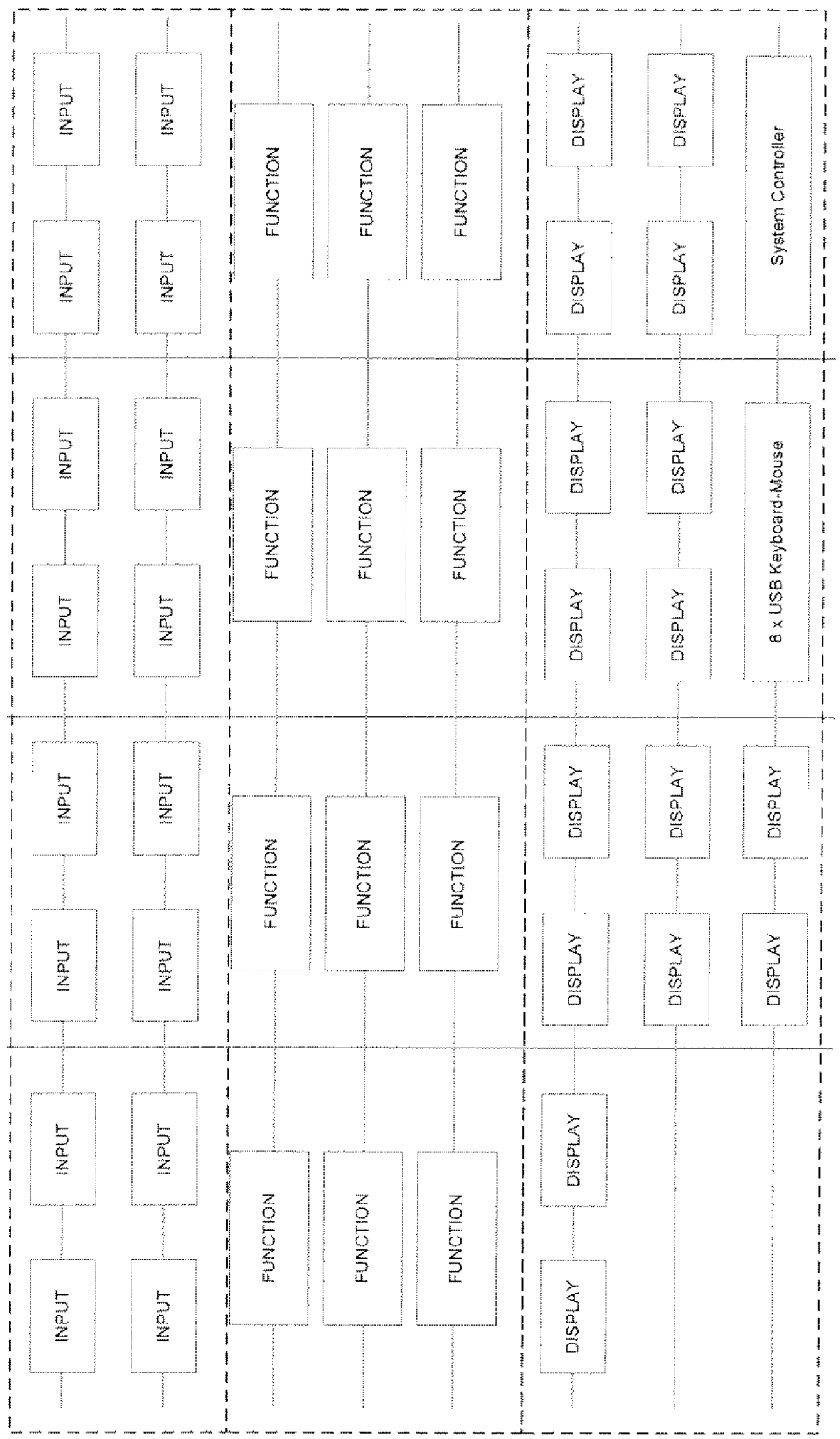
FIG. 4 illustrates an initial view of a GUI of a non-configured system according to an embodiment of the invention.
Figure 5:
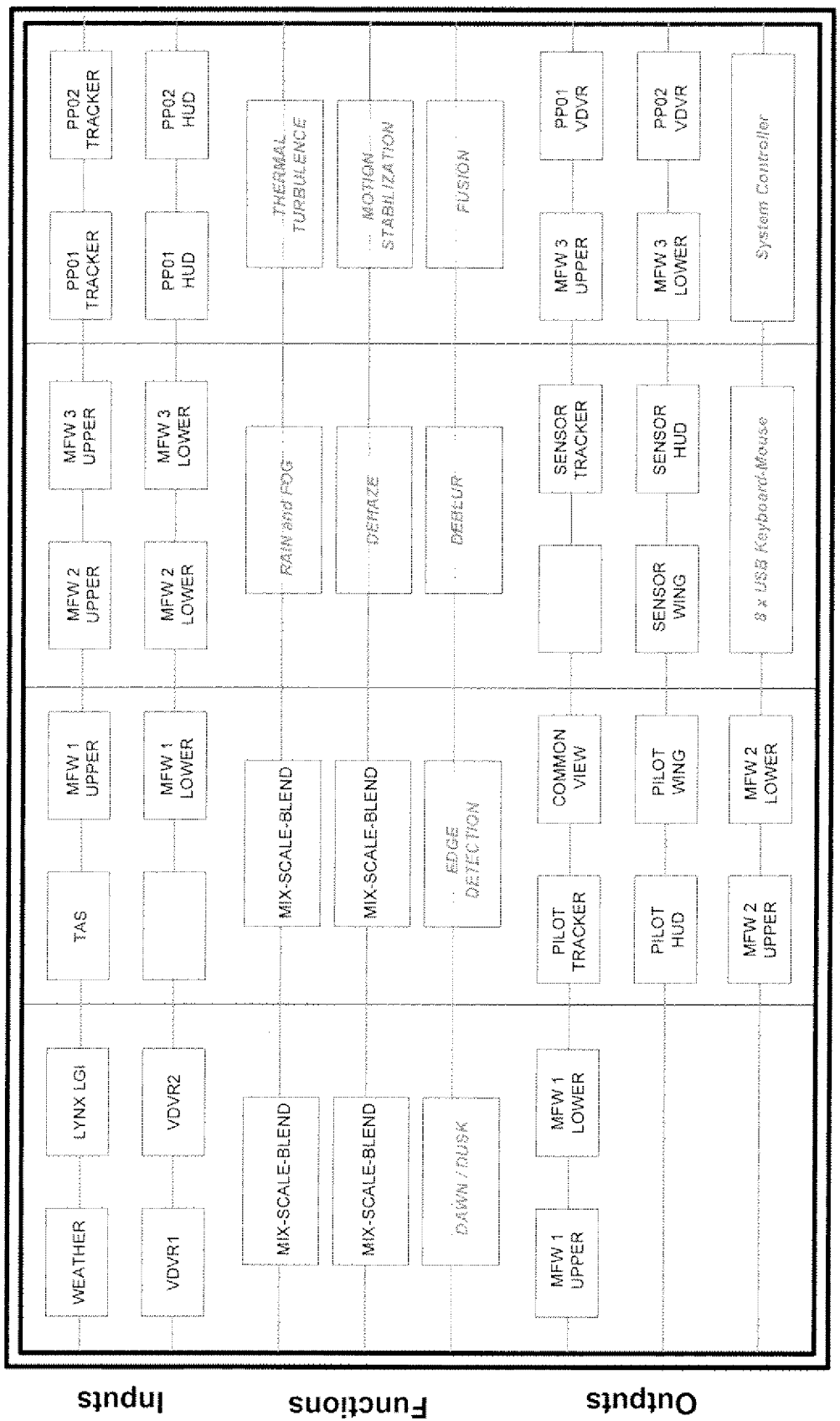
FIG. 5 illustrates a first step of the configuration of a system according to an embodiment of the invention.
Figure 6:
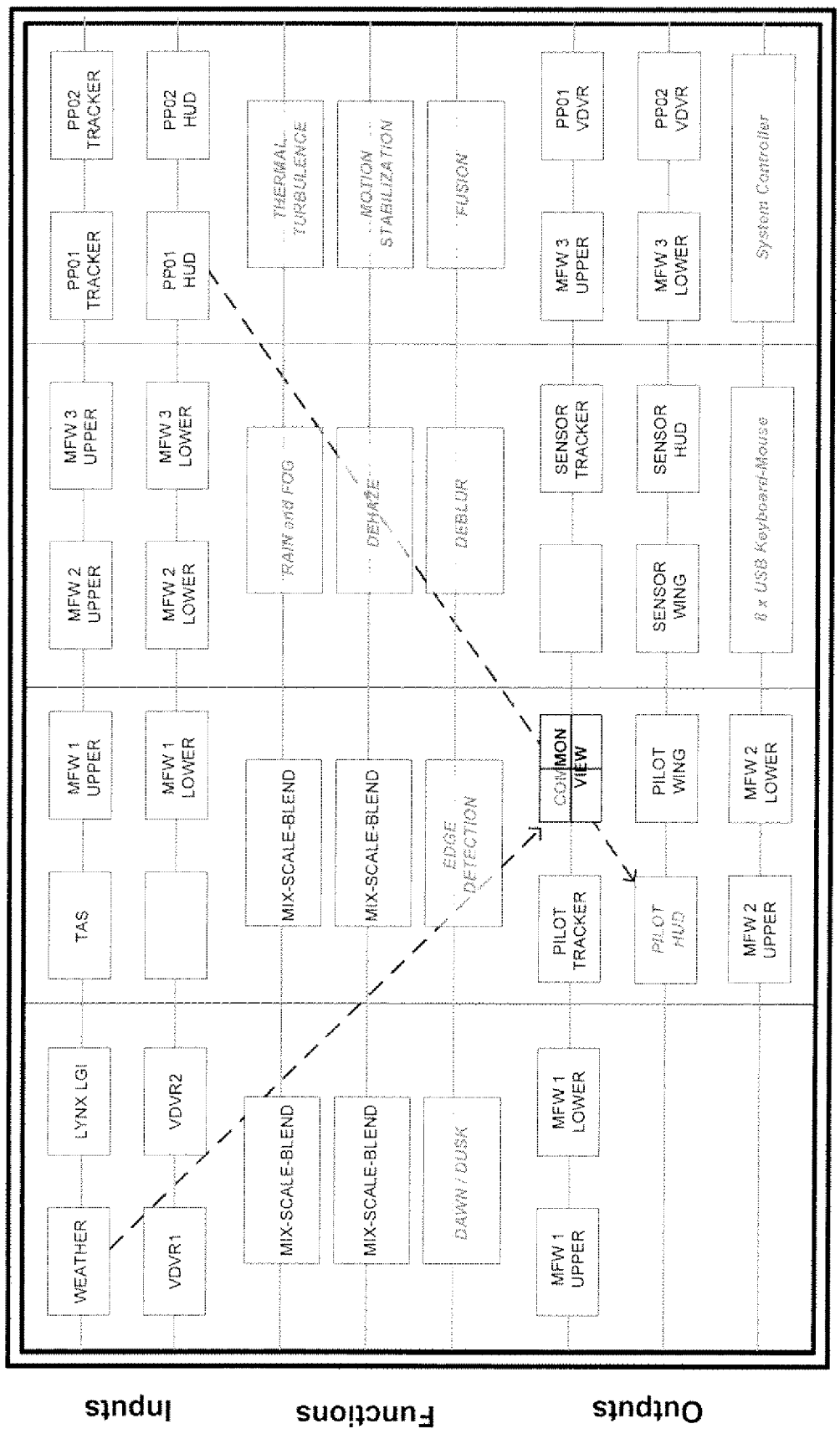
FIG. 6 illustrates a second step of the configuration of a system according to an embodiment of the invention.

FIG. 4 illustrates an initial view of a GUI of a non-configured system for installation in a UAV ground station. As illustrated by FIG. 5, configuration begins by labeling the sources and destinations for the input modules and output modules, respectively, and determining the specific functions of the function modules. Next, as illustrated by FIG. 6, the destinations for the input data streams are determined. For example, a weather data stream, such as provided by a weather station or other data source, is configured to be displayed in a common view display device; and the output of the heads-up display of a pilot payload operator station is configured to be displayed on the pilot's heads-up display.

Figure 7:
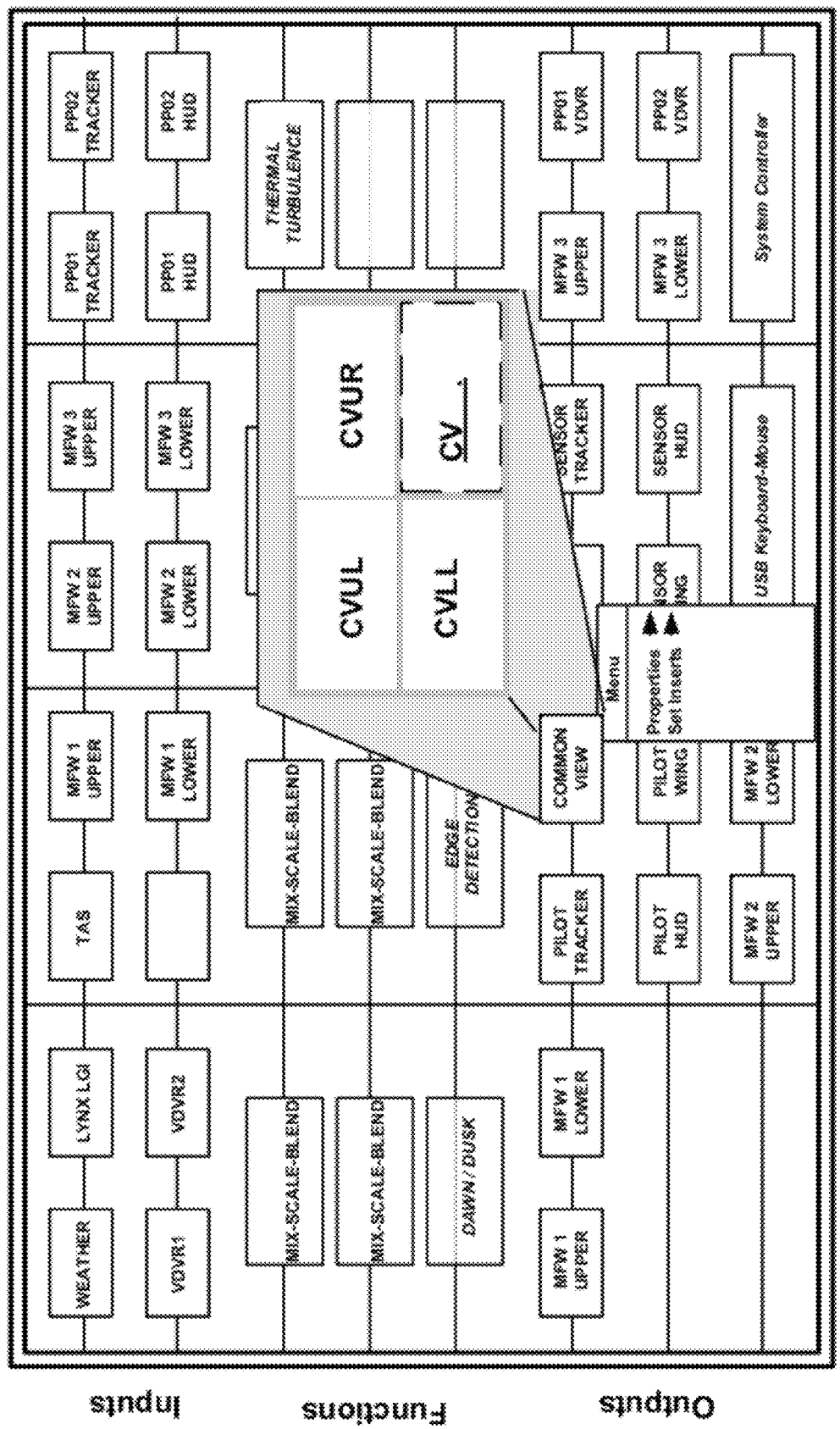
FIG. 7 illustrates a third step of the configuration of a system according to an embodiment of the invention.

In some embodiments, a third step illustrated in FIG. 7, allows a system user to define one or more virtual displays, such as optional picture-in-picture displays, that can be activated during system operation. A user can define one or more display areas (i.e., virtual displays) within any physical or conceptual display screen, which can then serve as a destination for an image stream that may have been processed through an image processing module (e.g., scaled, blended, chroma-keyed). For example, a common view display device may be partitioned into two or more virtual displays to allow multiple input streams to be displayed simultaneously, such as displaying multiple versions of a live image stream derived from different input sources or different image enhancement processes.

Additionally, in some embodiments, the user can define one or more touch sensitive areas, also referred to as virtual buttons 189, on an external display monitor that can be monitored for touch activity to control the system or to emit user programmable data strings to one or more external computers or devices (e.g., data strings might be used to tune a radio or other external device) associated with the display.

Figure 8:
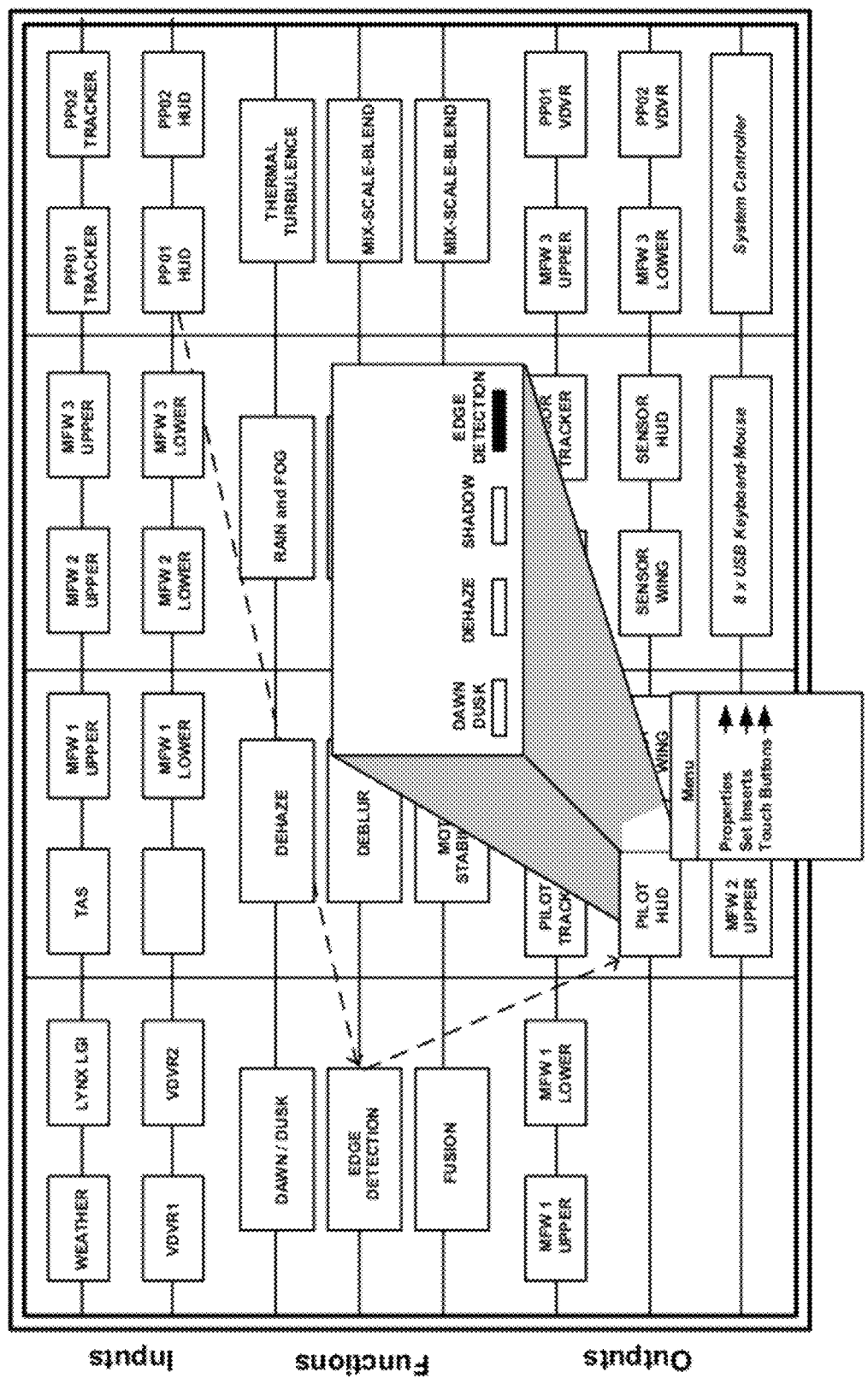
FIG. 8 illustrates a fourth step of the configuration of a system according to an embodiment of the invention.

In the fourth step, as illustrated in FIG. 8, a plurality of desired system commands are named and defined by selecting routing configurations corresponding the desired command. For example, as described with respect to FIG. 6, the PPO-1 HUD data stream is routed to the pilot HUD display and the system may be configured such that a command is defined by a route between the source and destination that is intersected by one or more functional modules, such as an edge detection command resulting in the PPO-1 data stream being routed through an edge detection function prior to display on the pilot HUD.

Figure 9A:
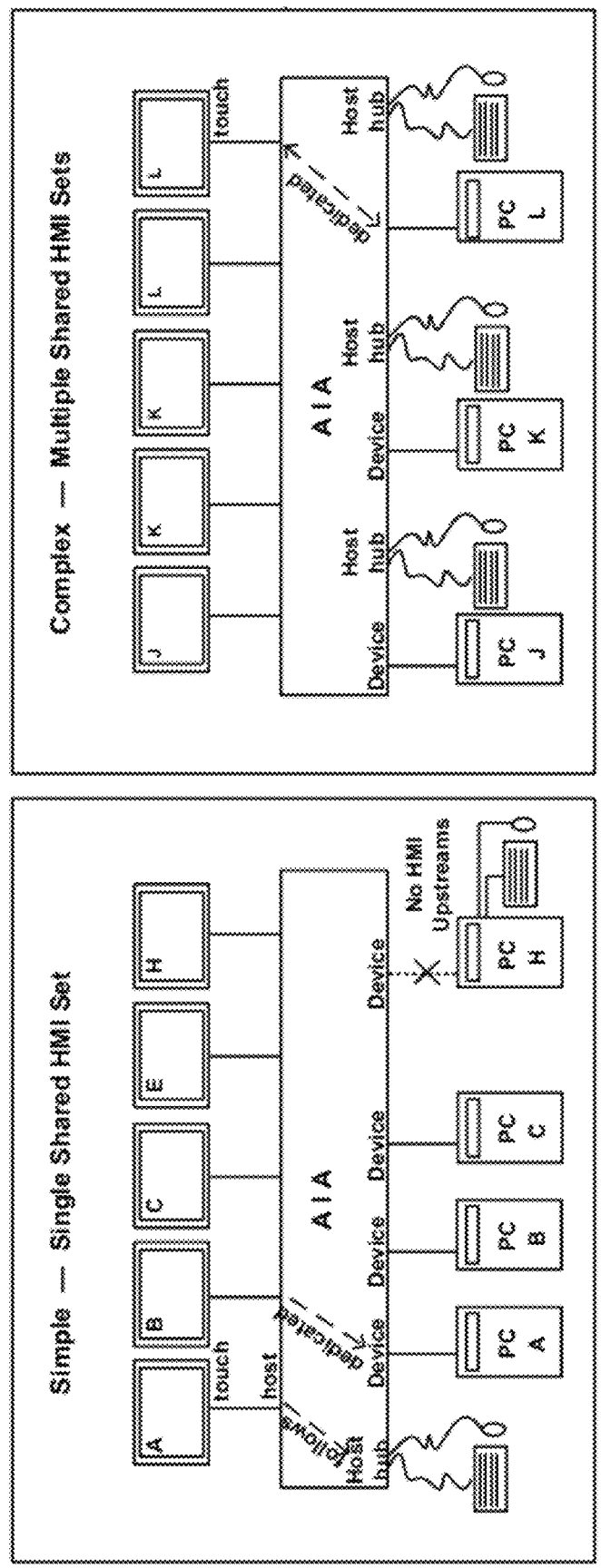
FIG. 9A illustrates how system and connected device control can be centralized or distributed using system routing functions according to an embodiment of the invention.

FIG. 9A illustrates how system and connected device control can be centralized or distributed using system routing functions. For example, a human machine interface (HMI) such as a keyboard and mouse may be coupled to the switch fabric such that it is able to control the implementation of the predetermined commands and to reroute streams according to the desires of the system user. Multiple HMIs may be provided and may share control or be given control of a subset of the input and output devices according to system configuration. Accordingly, an additional step of system configuration may comprise mapping the HMIs between the display devices, the source devices, and the functional image processing modules.

Additionally, although not shown, in some embodiments, a display device can communicate human interface device (HID) touch screen or operator button events back to the system through the output interface providing it with an image source. By doing so, the system eliminates the need for an additional cable and or an external computer to monitor and react to the human interface device events for purposes of controlling the system. Additionally, the system can appropriately route human interface device (HID) events to source computers associated with a particular virtual display inserted within a display device.

For example, the touch screen events may be detected by the display device and passed back to the system (i.e., the image source) using a Display Data Channel (DDC) to control the configuration and routing of the system. The Display Data Channel (DDC) is a serial bus incorporated into some video monitors, thereby allowing some of those specifically configured display devices to provide their image source with descriptive data called Extended Device Identification Data (EDID). Though this serial channel is normally used to query the display for identification or operating attributes, in the current example it is being utilized to also relay control information from the display device to the system. It should be appreciated that other channels similar to that of the Display Data Channel incorporated into an image source connection could also be utilized to implement similar functionality in other embodiments.

Figure 9B:
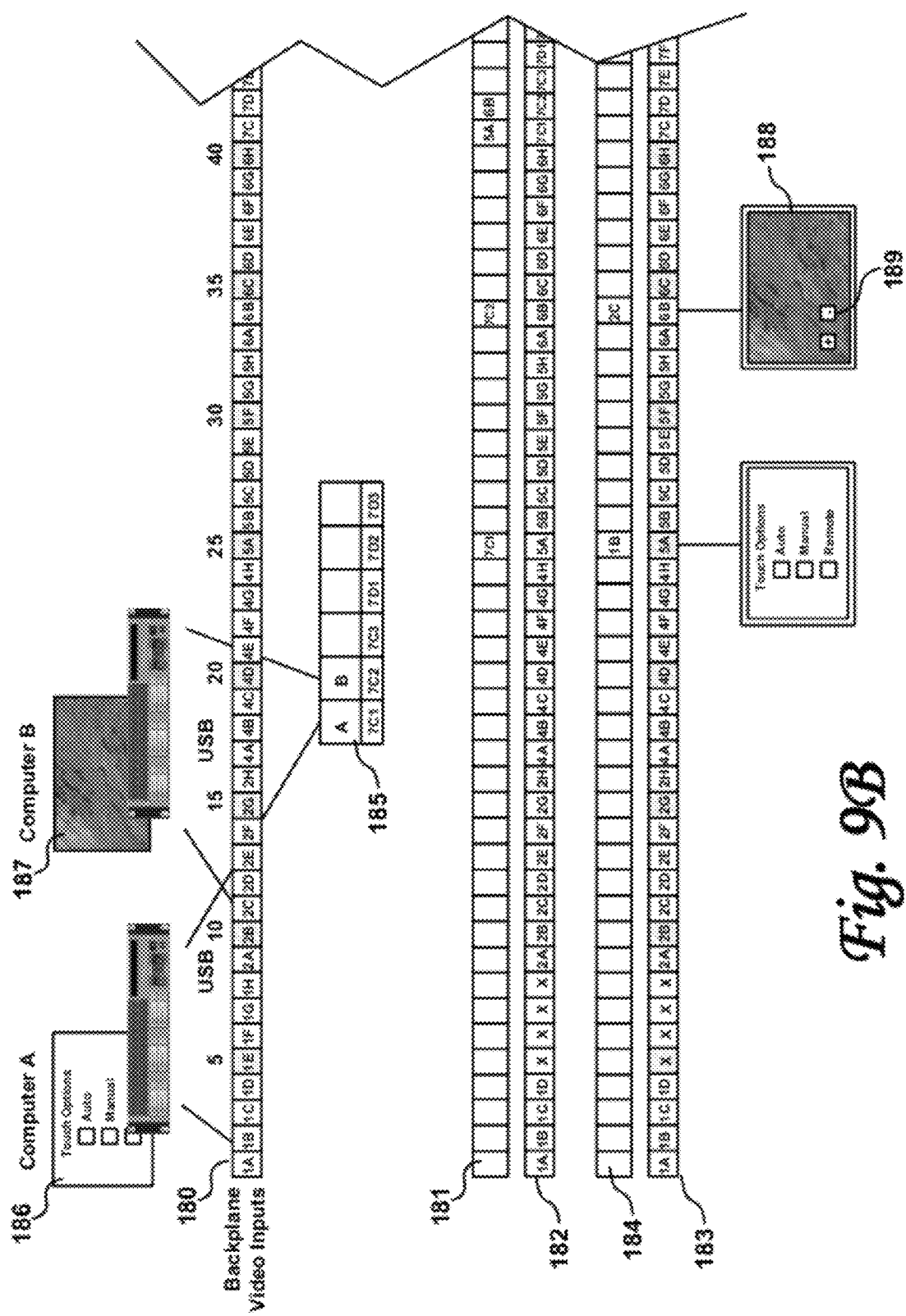
FIG. 9B illustrates a switch fabric implementation of device control according to an embodiment of the invention.

FIG. 9B illustrates a method of implementing distributed system control functions according to an embodiment of the invention. In this embodiment, input port array 180, output port array 183, and mapping table 184 are substantially similar to the corresponding arrays described with respect to FIG. 3B. Additionally, control port arrays 182 and 185 are provided to allow reconfigurable control of input devices 186 and 187. In this embodiment, input devices 186 and 187 are electrically coupled to output control port array 185 to allow control signals to be transmitted from output control port array 185 to the input devices 186 and 187. For example, the control signals may be transmitted according to a USB standard and the output control port array 185 may comprise a plurality of addressable USB ports. In the illustrated embodiment, an input control port array 182 is provided with ports corresponding to the output ports of array 183. These ports are mapped 181 to output control ports of output control port array 185. For example, display device 188 may comprise a touch screen display with a video connection coupled to output ports 6B of array 183 and a USB connection coupled to port 6B of array 182. Port 6B of array 182 is mapped to port 7C2 of array 185, which is in turn electrically coupled to input device 187. Accordingly, touch commands executed on display 188 are transmitted to input device 187. As described herein, in embodiments employing USB or other full-duplex control protocols, modules may be coupled to the ports of array 182 and array 185 to allow the full-duplex control protocols to be translated into corresponding half duplex signals for transmission through the system and to be retranslated into the original full-duplex control signals for transmission to the input devices.

For some embodiments in accordance with this invention, the various systems described herein are implemented into a display, such as a video monitor, computer monitor, or projector system, as one or more integrated components. Such an embodiment would, for example, allow a device providing an image stream to directly connect to the display and have various image processing functions applied to the image stream before being shown on the display output. Additionally, for some embodiments where the system is integrated into a display, a mechanism for controlling the system may be provided either through inputs and features integrated into the display (e.g., on screen menu and buttons on the front of the display), or through a separate control mechanism detached from the display, such as touch panel. Optionally, where this control mechanism is separate and detached from the display, the control mechanism may be an overlay configured to be placed over the display output. In some embodiments, the control mechanism is directly connected to the system and system modules to avoid relaying system controls through the output device. For example, if system outputs are to a video input of a computer, the control mechanism is connected directly to the system, so that system control commands are not directed through the computer.

Figure 9C:
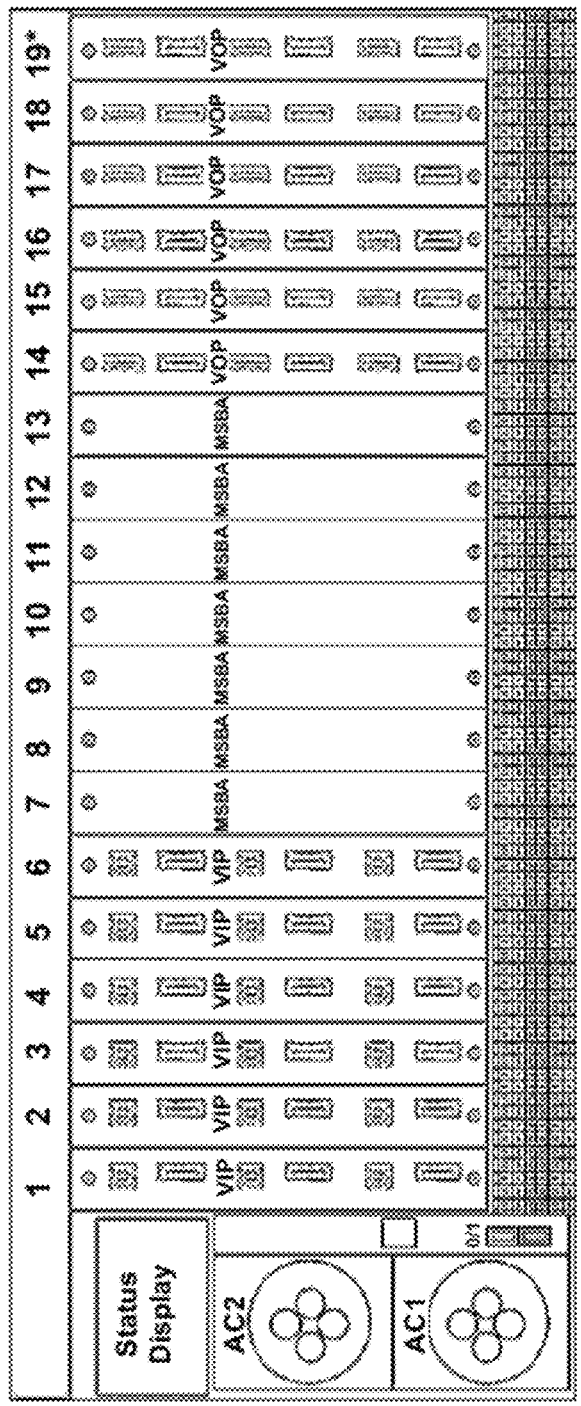
FIG. 9C illustrates an alternative configuration of a switch fabric chassis according to an embodiment of the invention.

Although some embodiments of the invention have been described as comprising circuit cards, either horizontal or vertically oriented, and making up a switched fabric, alternative embodiments may be employed. For example, FIG. 9C illustrates such an alternative embodiment utilizing vertical 5.25" circuit cards.

Figure 10:
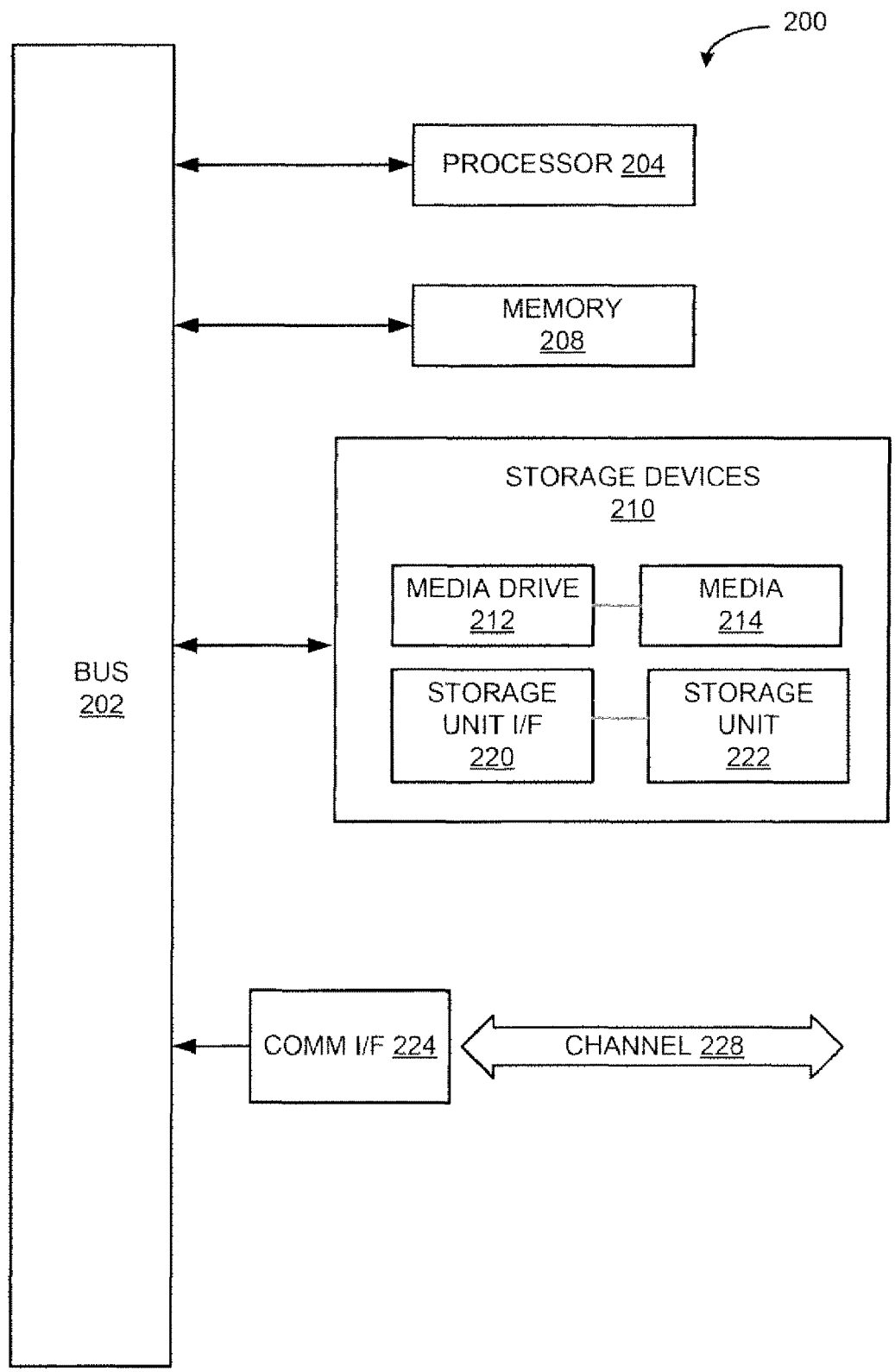
FIG. 10 illustrates an example computing module with which various features of embodiments of the invention may be implemented.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 200. After reading this description, it will become apparent to a person skilled in the relevant art how to implement the invention using other computing modules or architectures.

Referring now to FIG. 10, computing module 200 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 200 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 200 might include, for example, one or more processors, controllers, control modules, or other processing devices, such as a processor 204. Processor 204 might be implemented using a general-purpose or special-purpose processing engine such as, for example, a microprocessor, controller, or other control logic. In the illustrated example, processor 204 is connected to a bus 202, although any communication medium can be used to facilitate interaction with other components of computing module 200 or to communicate externally.

Computing module 200 might also include one or more memory modules, simply referred to herein as main memory 208. For example, preferably random access memory (RAM) or other dynamic memory, might be used for storing information and instructions to be executed by processor 204. Main memory 208 might also be used for storing temporary variables or other intermediate information during execution of instructions to be executed by processor 204. Computing module 200 might likewise include a read only memory ("ROM") or other static storage device coupled to bus 202 for storing static information and instructions for processor 204.

The computing module 200 might also include one or more various forms of information storage mechanism 210, which might include, for example, a media drive 212 and a storage unit interface 220. The media drive 212 might include a drive or other mechanism to support fixed or removable storage media 214. For example, a hard disk drive, a floppy disk drive, a magnetic tape drive, an optical disk drive, a CD or DVD drive (R or RW), or other removable or fixed media drive might be provided. Accordingly, storage media 214 might include, for example, a hard disk, a floppy disk, magnetic tape, cartridge, optical disk, a CD or DVD, or other fixed or removable medium that is read by, written to or accessed by media drive 212. As these examples illustrate, the storage media 214 can include a computer usable storage medium having stored therein computer software or data.

In alternative embodiments, information storage mechanism 210 might include other similar instrumentalities for allowing computer programs or other instructions or data to be loaded into computing module 200. Such instrumentalities might include, for example, a fixed or removable storage unit 222 and an interface 220. Examples of such storage units 222 and interfaces 220 can include a program cartridge and cartridge interface, a removable memory (for example, a flash memory or other removable memory module) and memory slot, a PCMCIA slot and card, and other fixed or removable storage units 222 and interfaces 220 that allow software and data to be transferred from the storage unit 222 to computing module 200.

Computing module 200 might also include a communications interface 224. Communications interface 224 might be used to allow software and data to be transferred between computing module 200 and external devices. Examples of communications interface 224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 224 might typically be carried on signals, which can be electronic, electromagnetic (which includes optical) or other signals capable of being exchanged by a given communications interface 224. These signals might be provided to communications interface 224 via a channel 228. This channel 228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 208, storage unit 220, media 214, and channel 228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 200 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of ordinary skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for switching an image stream input to an image stream output, comprising:
   an image stream input interface;
   an image stream output interface;
   a first image processing module configured to accept an image stream from the image stream input interface or another image processing module, apply an image processing function to the image stream, and output a processed image stream;
   a second image processing module; and
   a switching matrix in communication with the image stream input interface, the image stream output interface, the first image processing module, and the second image processing module, wherein the switching matrix is configured to:
      selectively map the image stream input interface to the image stream output interface or to the first image processing module, and
      selectively map the processed image stream from the first image processing module to the image stream output interface or to the second image processing module.

2. The system of claim 1, further comprising a data input interface, wherein the switching matrix is further in communication with the data input interface such that the switching matrix can further selectively map the data input interface to the image stream output interface or to the first image processing module.

3. The system of claim 2, wherein the image stream input interface comprises the data input interface.

4. The system of claim 1, wherein the switching matrix can selectively map the image stream input interface or the processed image stream in real-time.

5. The system of claim 1, wherein the switching matrix can selectively map the image stream input interface to more than one image processing module or to more than one image stream output interface simultaneously.

6. The system of claim 1, wherein the switching matrix can selectively map the processed image stream to more than one image processing module or to more than one image stream output interface simultaneously.

7. The system of claim 1, wherein the switching matrix can selectively map the image stream input interface or the processed image stream based on a criterion.

8. The system of claim 7, wherein the criterion relates to source or content of the image stream input interface or the processed image stream.

9. The system of claim 7, wherein the criterion for the processed image stream relates to results of a preceding image processing module.

10. The system of claim 1, wherein the image processing module can process a plurality of image streams in parallel.

11. The system of claim 1, wherein the image stream input interface or image stream output interface has a Digital Video Interface (DVI) connector, High-definition Multimedia Interface (HDMI) connector, a Bayonet Neill-Concelman (BNC) connector, a fiber optic connector, a DisplayPort connector, a Universal Serial Bus (USB) connector, or a Firewire (IEEE1394) connector.

12. The system of claim 1, wherein the image stream input interface is configured to convert from or the image stream output interface is configured to: a Digital Video Interface (DVI) standard, a High-definition Multimedia Interface (HDMI) compatible standard, a Red-Green-Blue (RGB) Analog standard, a Red-Green-Blue (RGB) Digital standard, a DisplayPort standard, a National Television System Committee (NTSC) standard, a Phase Alternate Line (PAL) standard, or a Serial Digital Interface (SDI) standard.

13. The system of claim 1, wherein the system comprises a plurality of image processing modules.

14. The system of claim 1, wherein the system comprises a plurality of image stream input interfaces.

15. The system of claim 1, wherein the system comprises a plurality of image stream output interfaces.

16. The system of claim 1, wherein the image processing function comprises an image stream mix function, an image stream scale function, an image stream blend function, an image stream encoding algorithm, or an image stream enhancement function.

17. The system of claim 1, wherein the image stream enhancement function comprises a de-haze function, a de-blur function, a shadow function, a dawn-dusk function, a fusion function, a stabilization function, a thermal turbulence function, an equalization function, an edge detection function, a rain and fog function, or a light optimizing function.

18. The system of claim 1, wherein if the image stream is provided by an endoscope, the image processing function can enhance the image stream for detecting texture differences in living tissue, detecting a polyp, detecting anomalous tissue, detect blood circulation, or identifying reference locations for subsequent registration of images from another modality.

19. The system of claim 18, wherein a light optimizing function adjusts a color channel for the image stream for detecting a polyp.

20. The system of claim 1, wherein the image stream enhancement function performed by the image processing module comprises an auto-focus function capable of adjusting focus of an image stream capture device that is coupled to the image stream input interface and producing the image stream.

21. The system of claim 20, wherein the auto-focus function comprises the operations of:
performing an edge detection algorithm on the image stream, thereby producing the processed image stream; and
generating focus instructions for the image stream capture device based on the processed image stream.

22. The system of claim 20, wherein the operations of the auto-focus function are repeated iteratively until the image stream capture device is in-focus.

23. The system of claim 20, wherein the edge enhancement algorithm utilizes a Laplacian convolution.

24. The system of claim 1 wherein the image stream input interface is configured to receive the image stream from an image stream capture device, an image stream playback device, a computer system, a sensor device, or a medical device.

25. The system of claim 1, wherein the image stream output interface is configured to output to a display, a computer system, or recording device.

26. The system of claim 1, wherein the system is configured to output an mage stream through a virtual display.

27. The system of claim 1, further comprising a control interface through which a user can operate the system, configure the system, or check status of the system.

28. The system of claim 27, wherein the system can detect what type of image stream input interface, image stream output interface, or image processing module is present in the system, and configure the system according to the type.

29. The system of claim 27, wherein the system can detect what type of image stream input interface, image stream output interface, or image processing module is present in the system, and configure the control interface according to the type.

30. The system of claim 27, wherein the control interface comprises a display touch panel having a graphical user interface, a keyboard, or a mouse.

31. The system of claim 27, wherein the control interface comprises virtual buttons.

32. The system of claim 27, wherein if the image stream output interface is outputting to a computer system, the control interface is directly connected to the system and not connected to the computer system.

33. The system of claim 1, wherein the system is integrated into a display having a display output, and the image stream output interface is in communication with the display output.

34. The system of claim 1, wherein the system can eliminate or reduce frame latency by configuring the first image processing module to apply processing results of a given frame to a subsequent frame.

35. The system of claim 1, wherein the system is configured to receive control information from a control interface device through the image stream output interface.

36. The system of claim 35, wherein the control information is received through a display data channel.

37. The system of claim 1, wherein the system is configured to send control information to an image source through the image stream input interface.

38. The system of claim 1, wherein the system is configured to send control information to a device external to the system, through the image stream input interface.

39. A method for switching an image stream input to an image stream output, comprising:
- receiving an original image stream from an image stream input interface;
- receiving a first processed image stream from a first image processing module, wherein the first image processing module generates the first processed image stream by applying a first image processing function to an image stream;
- using a switching matrix to selectively map the original image stream to:
  - a second image processing module, wherein the second image processing module is configured to receive the original image stream from the switching matrix, apply a second image processing function to the original image stream, and output a second processed image stream, or
  - an image stream output interface; and
- using the switching matrix to selectively map the first processed image stream to:
  - the second image processing module, wherein the second image processing module is further configured to receive the first processed image stream from the switching matrix, apply the second image processing function to the first processed image stream, and output a third processed image stream, or
  - the image stream output interface.

40. The method of claim 39, wherein when the switching matrix selectively maps the original image stream to the second image processing module, the method further comprises using the switching matrix to selectively map the second processed image stream to a third image processing module.

41. The method of claim 39, wherein the switching matrix selectively maps the image stream input interface or the processed image stream in real-time.

42. The method of claim 39, wherein the switching matrix selectively maps the image stream input interface to more than one image processing module or to more than one image stream output interface simultaneously.

43. The method of claim 39, wherein the switching matrix selectively maps the processed image stream to more than one image processing module or to more than one image stream output interface simultaneously.

44. The method of claim 39, wherein the switching matrix selectively maps the image stream input interface or the processed image stream based on a criterion implemented through the control interface.

45. The method of claim 44, wherein the criterion relates to source or content of the image stream input interface or the processed image stream.

46. The method of claim 44, criterion for the processed image stream relates to results of a preceding image processing module.

47. A computer readable storage medium having instructions embedded thereon configured to cause a processor to perform the operations of:
- receiving an original image stream from an image stream input interface;
- receiving first processed image stream from a first image processing module, wherein the first image processing module generates the first processed image stream by applying a first image processing function to an image stream;
- using a switching matrix to selectively map the original image stream to:
  - a second image processing module, wherein the second image processing module is configured to receive the original image stream from the switching matrix, apply a second image processing function to the original image stream, and output a second processed image stream, or
  - an image stream output interface; and
- using the switching matrix to selectively map the first processed image stream to:
  - the second image processing module, wherein the second image processing module is further configured to receive the first processed image stream from the switching matrix, apply the second image processing function to the first processed image stream, and output a third processed image stream, or
  - the image stream output interface.

48. The computer readable storage medium of claim 47, wherein when the switching matrix selectively maps the original image stream to the second image processing module, the instructions are further configured to cause a processor to perform the operation of using the switching matrix to selectively map the second processed image stream to a third image processing module.

49. The computer readable storage medium of claim 47, wherein when the switching matrix selectively maps the first processed image stream to the second image processing module, the instructions are further configured to cause a processor to perform the operation of using the switching matrix to selectively map the first processed image stream to a third image processing module.

50. The method of claim 39, wherein when the switching matrix selectively maps the first processed image stream to the second image processing module, the method further comprises using the switching matrix to selectively map the first processed image stream to a third image processing module.

* * * * *